Feb. 24, 1953     A. F. JELINEK ET AL     2,629,468
TOOL FEED CONTROL

Filed Oct. 8, 1946     22 Sheets-Sheet 1

INVENTORS.
ALFRED F. JELINEK &
WALTER E. GROSS
BY Richey & Watts
ATTORNEYS

Feb. 24, 1953  A. F. JELINEK ET AL  2,629,468
TOOL FEED CONTROL

Filed Oct. 8, 1946  22 Sheets-Sheet 2

INVENTORS
ALFRED F. JELINEK
& WALTER E. GROSS
Richey & Watts
ATTORNEYS

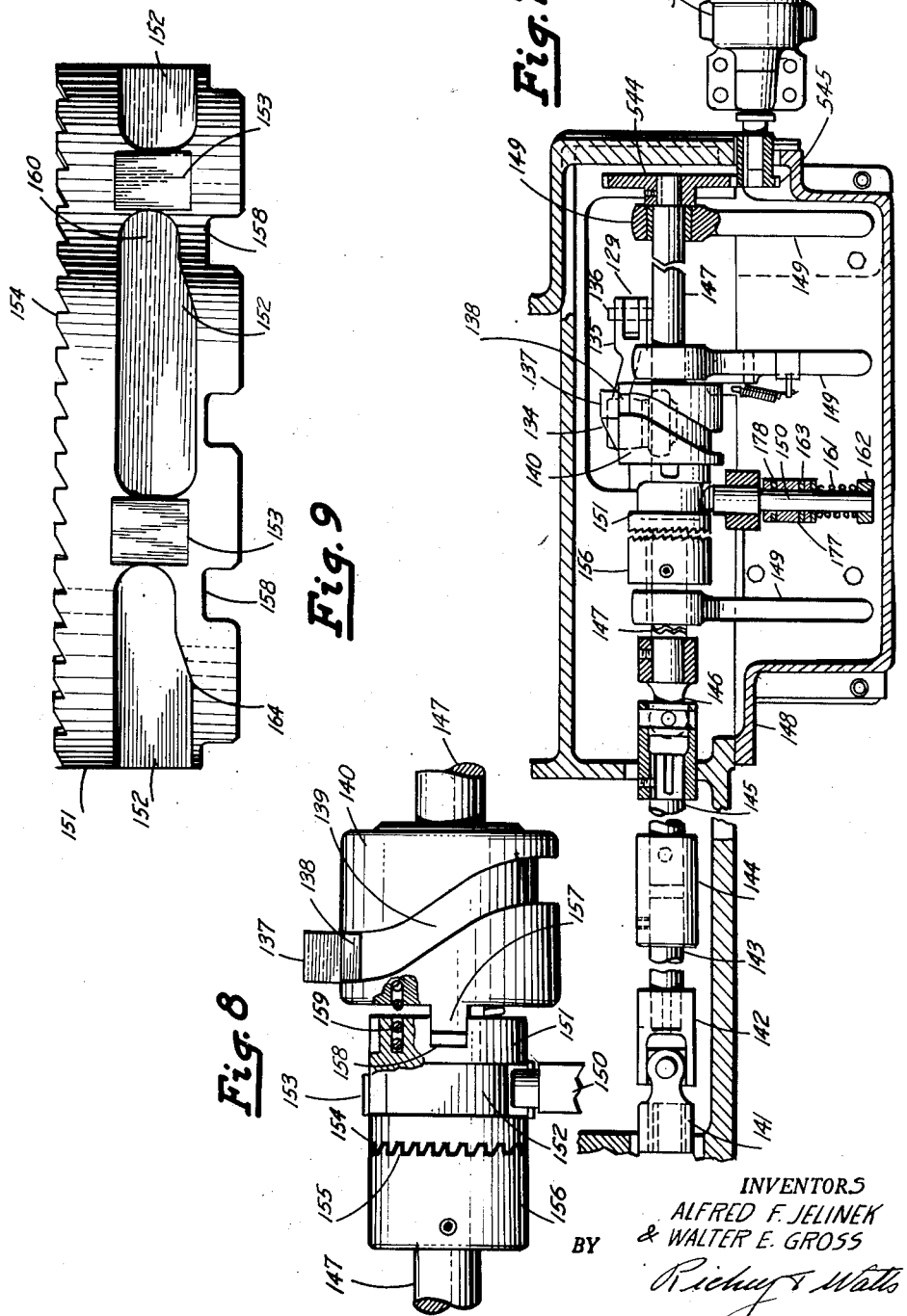

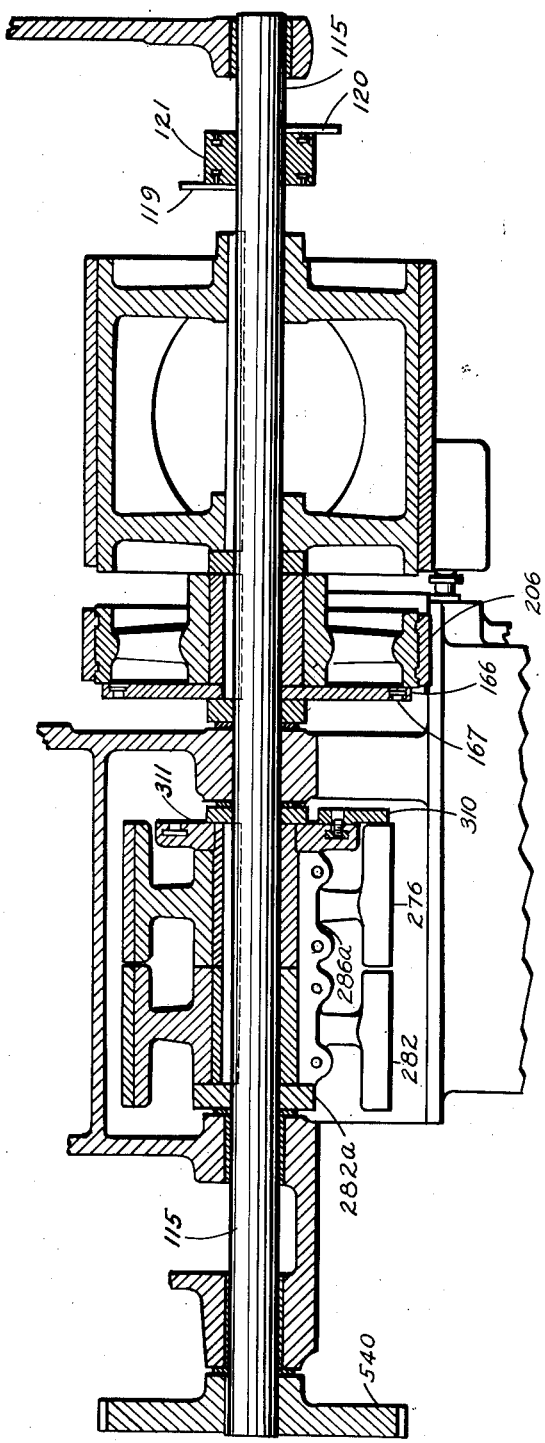
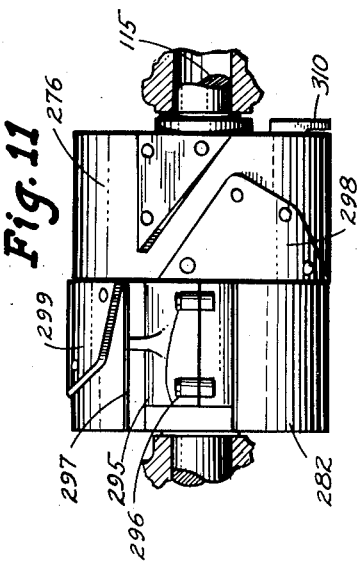

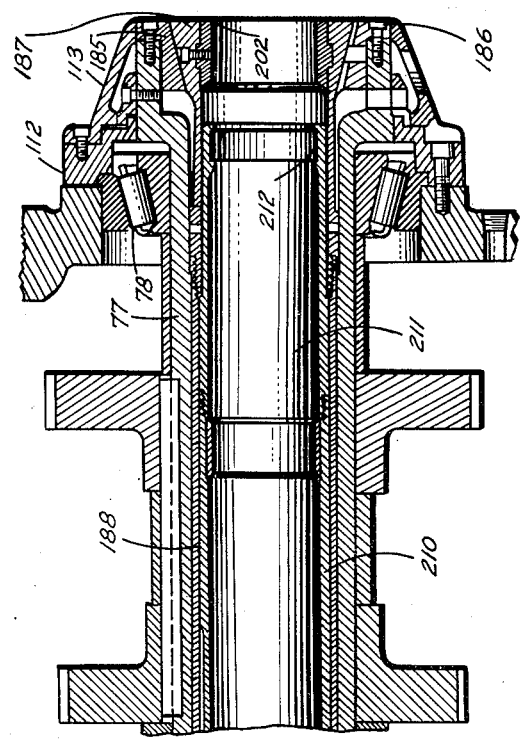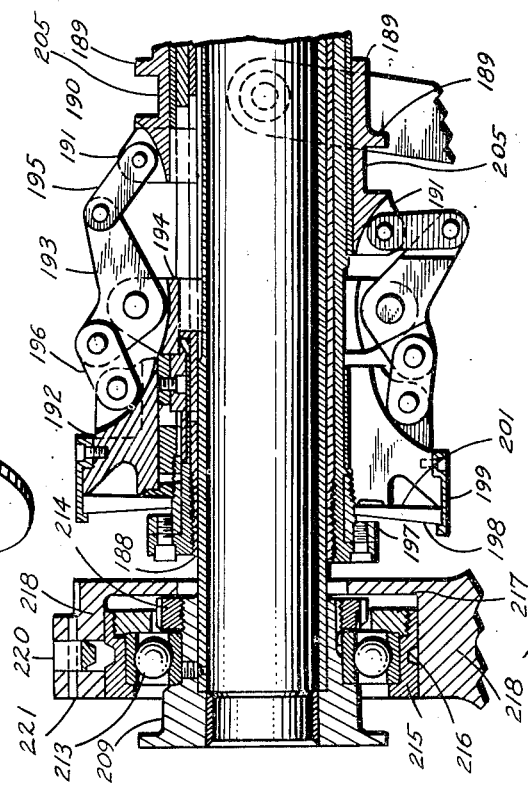

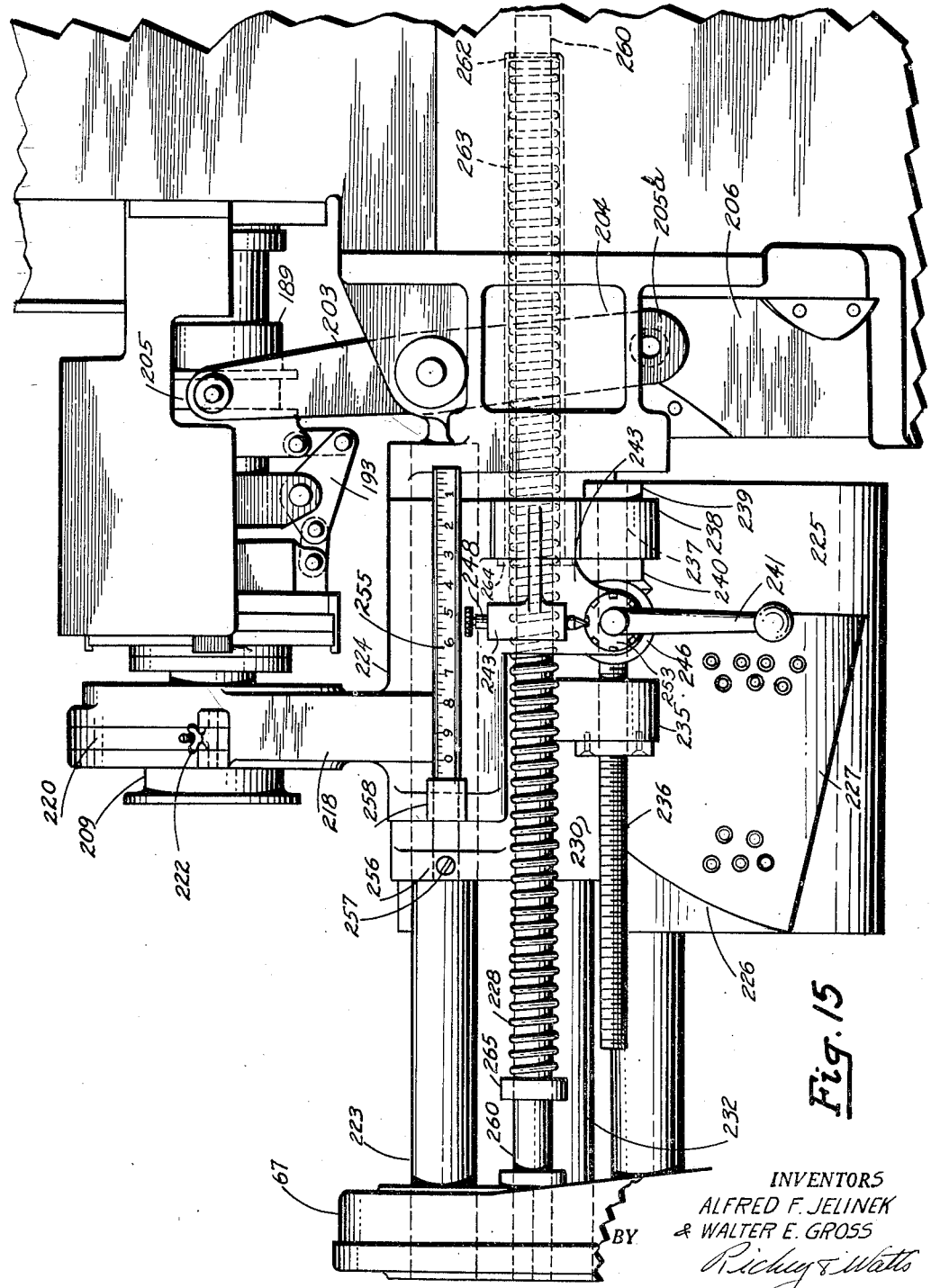

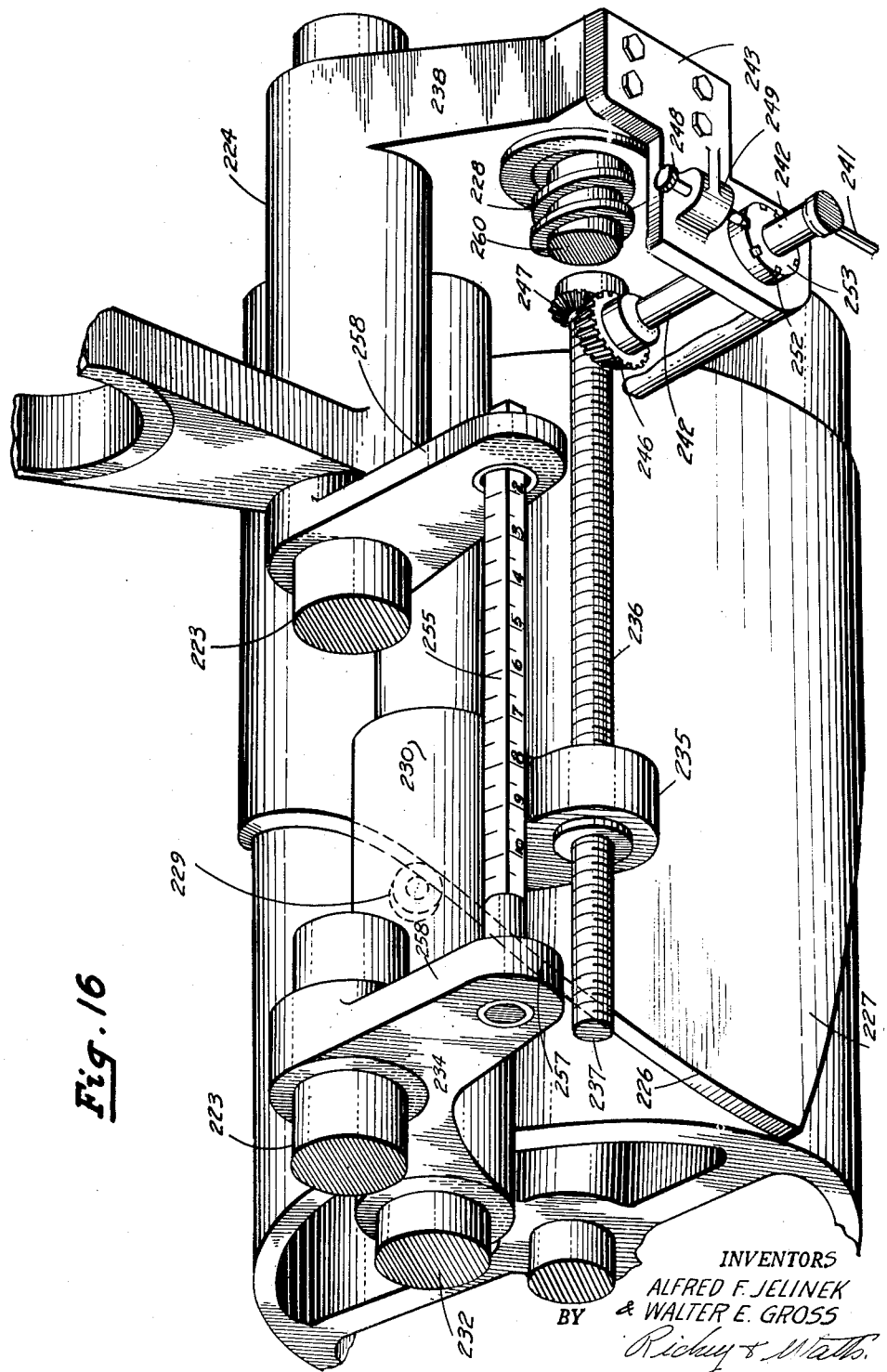

Feb. 24, 1953     A. F. JELINEK ET AL     2,629,468
TOOL FEED CONTROL
Filed Oct. 8, 1946     22 Sheets-Sheet 12
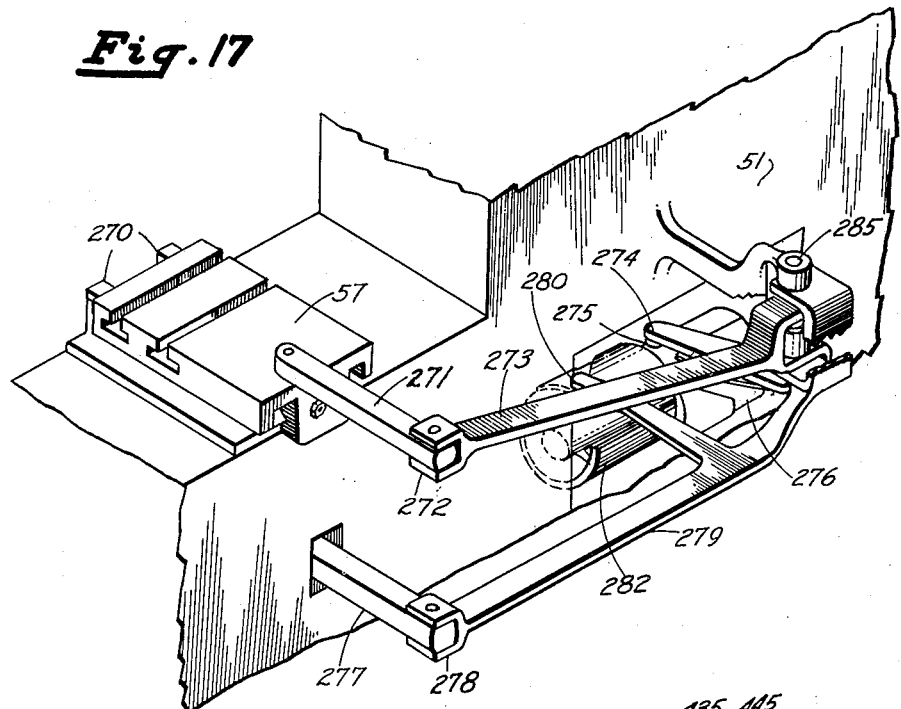
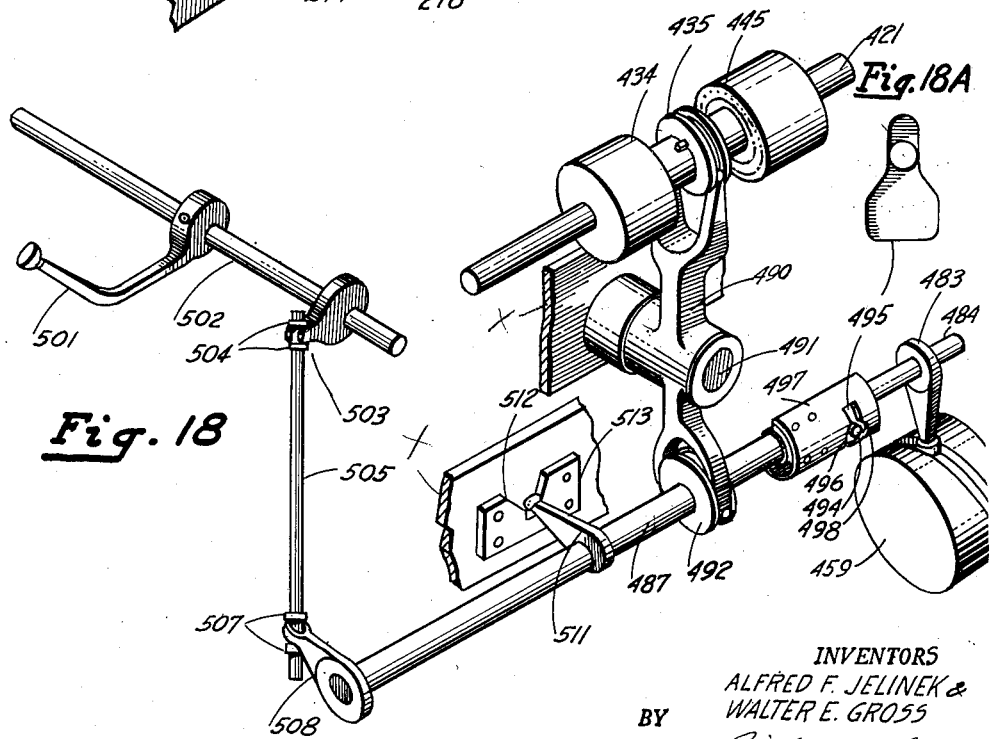
INVENTORS
ALFRED F. JELINEK &
WALTER E. GROSS
BY
Richey & Watts
ATTORNEYS

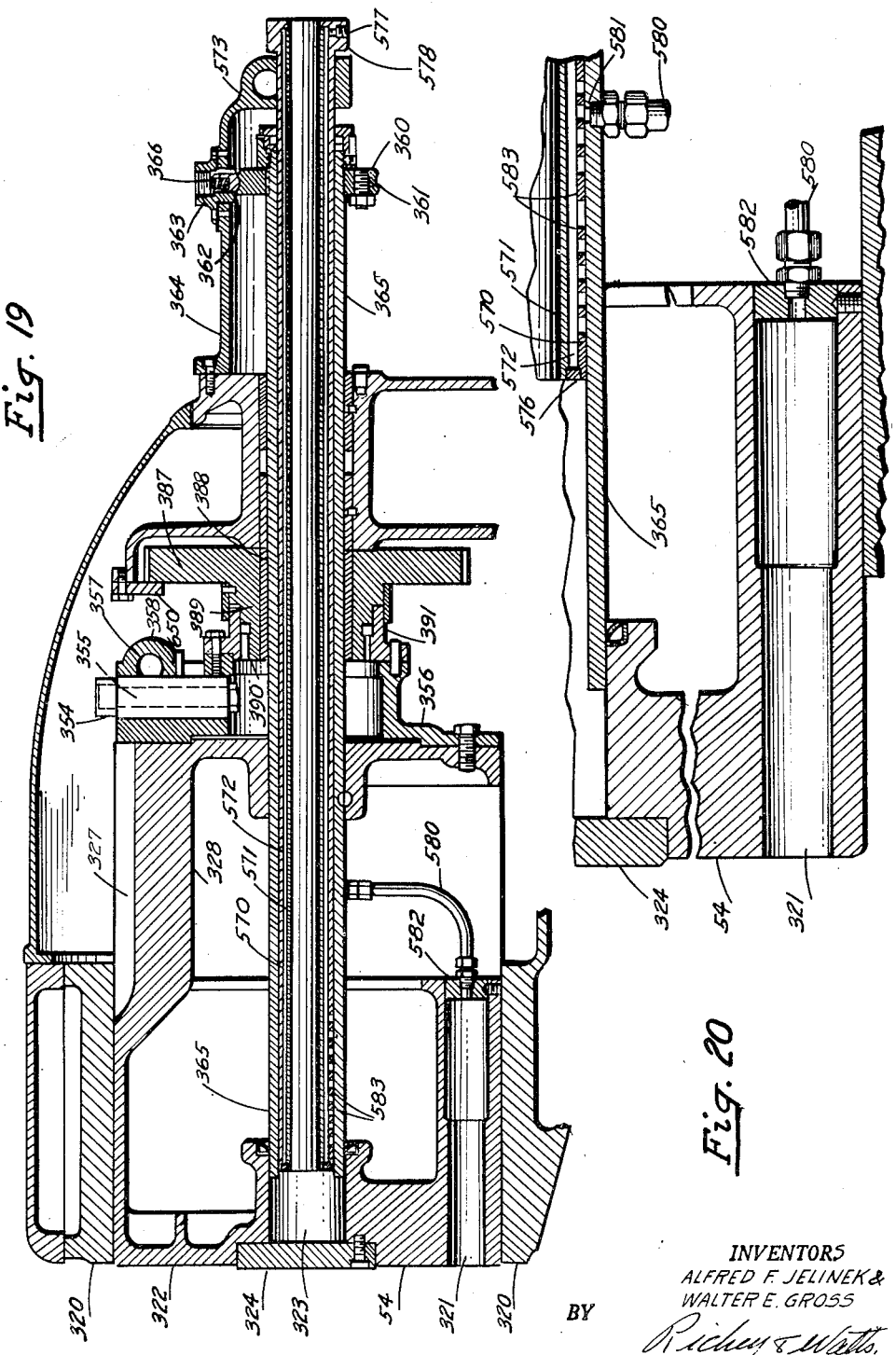

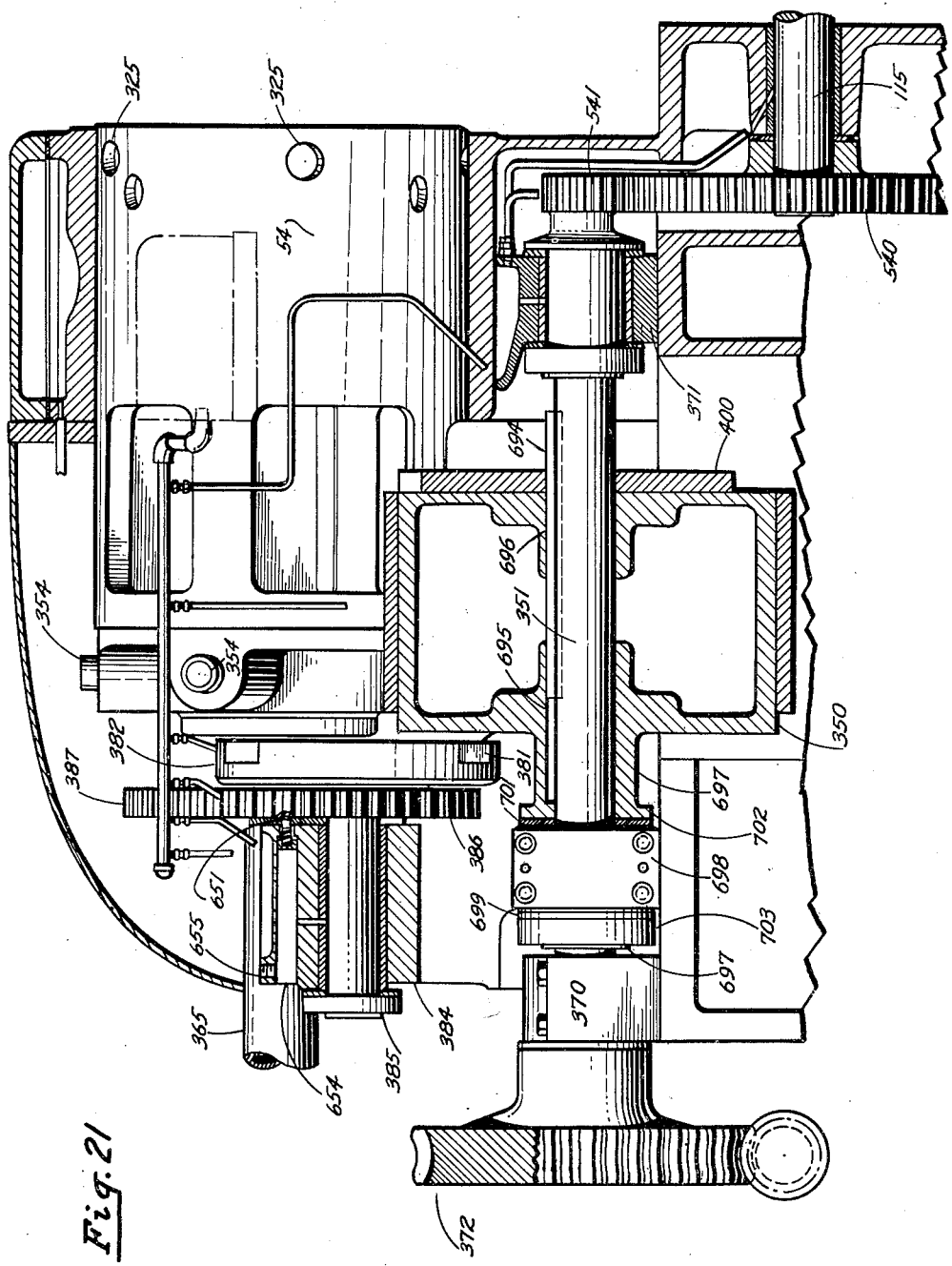

Feb. 24, 1953 A. F. JELINEK ET AL 2,629,468
TOOL FEED CONTROL
Filed Oct. 8, 1946 22 Sheets-Sheet 15

INVENTORS
ALFRED F. JELINEK &
BY  WALTER E. GROSS
Richey & Watts
ATTORNEYS

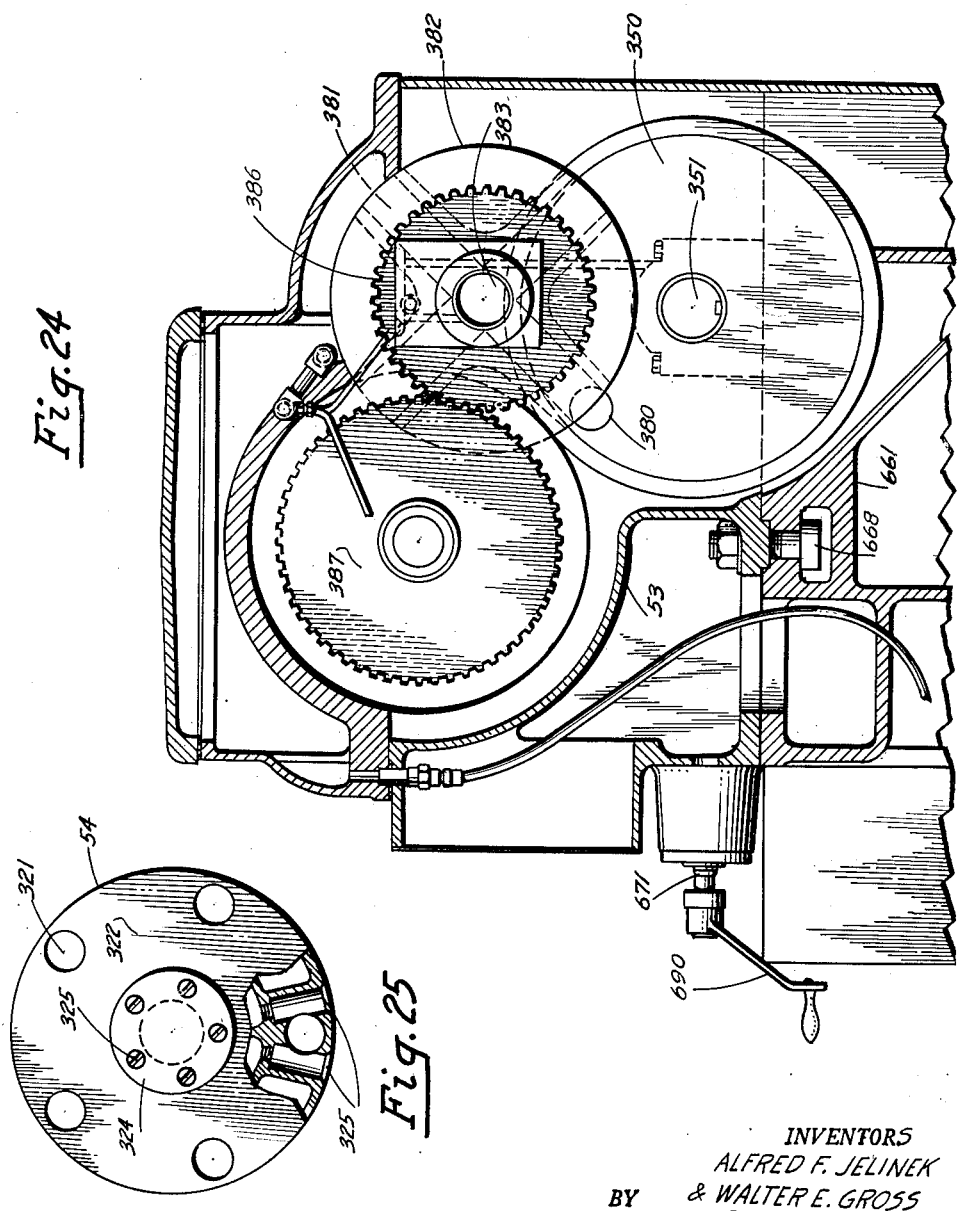

Feb. 24, 1953 A. F. JELINEK ET AL 2,629,468
TOOL FEED CONTROL
Filed Oct. 8, 1946 22 Sheets-Sheet 17

INVENTORS
ALFRED F. JELINEK
& WALTER E. GROSS
BY
ATTORNEYS

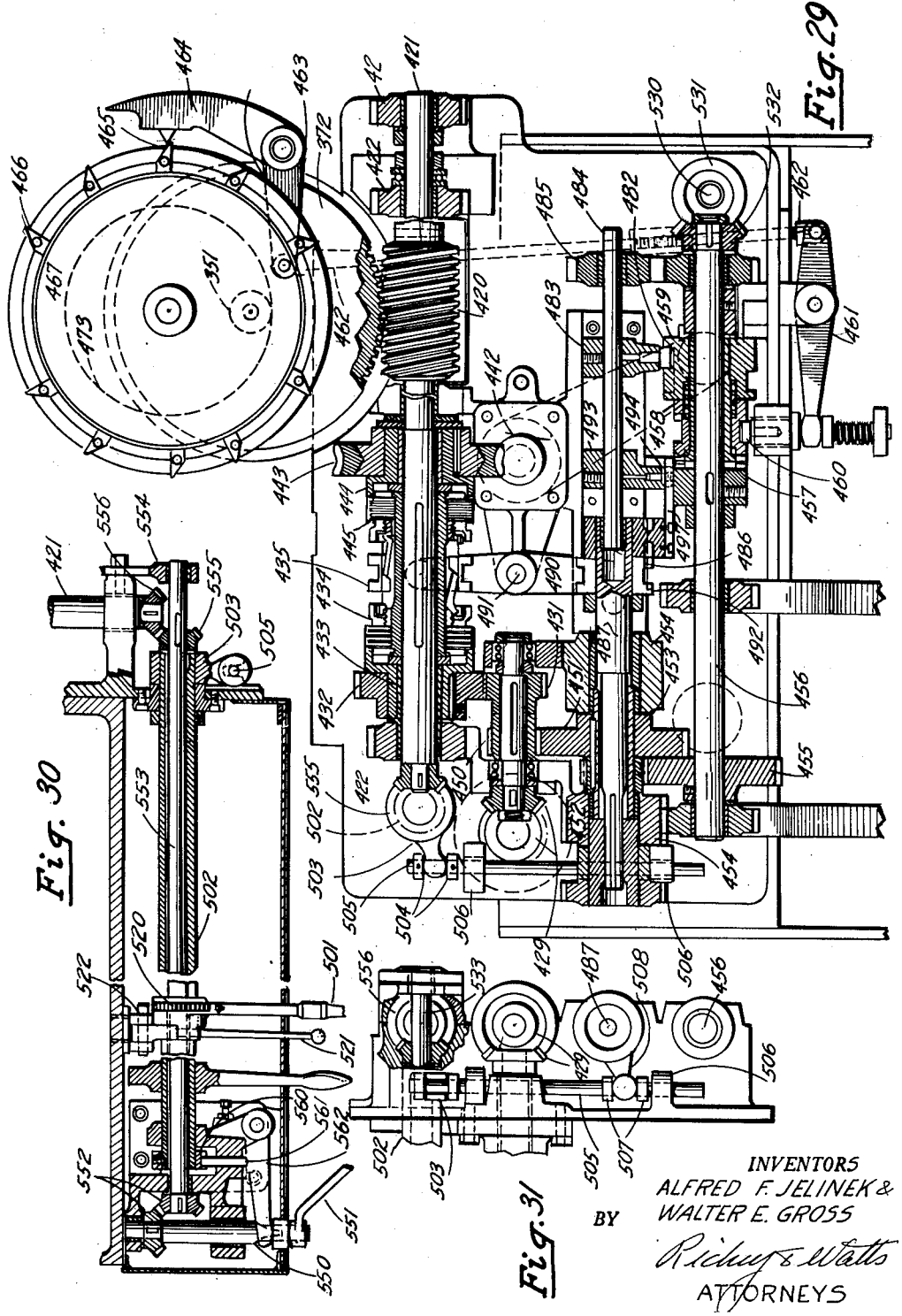

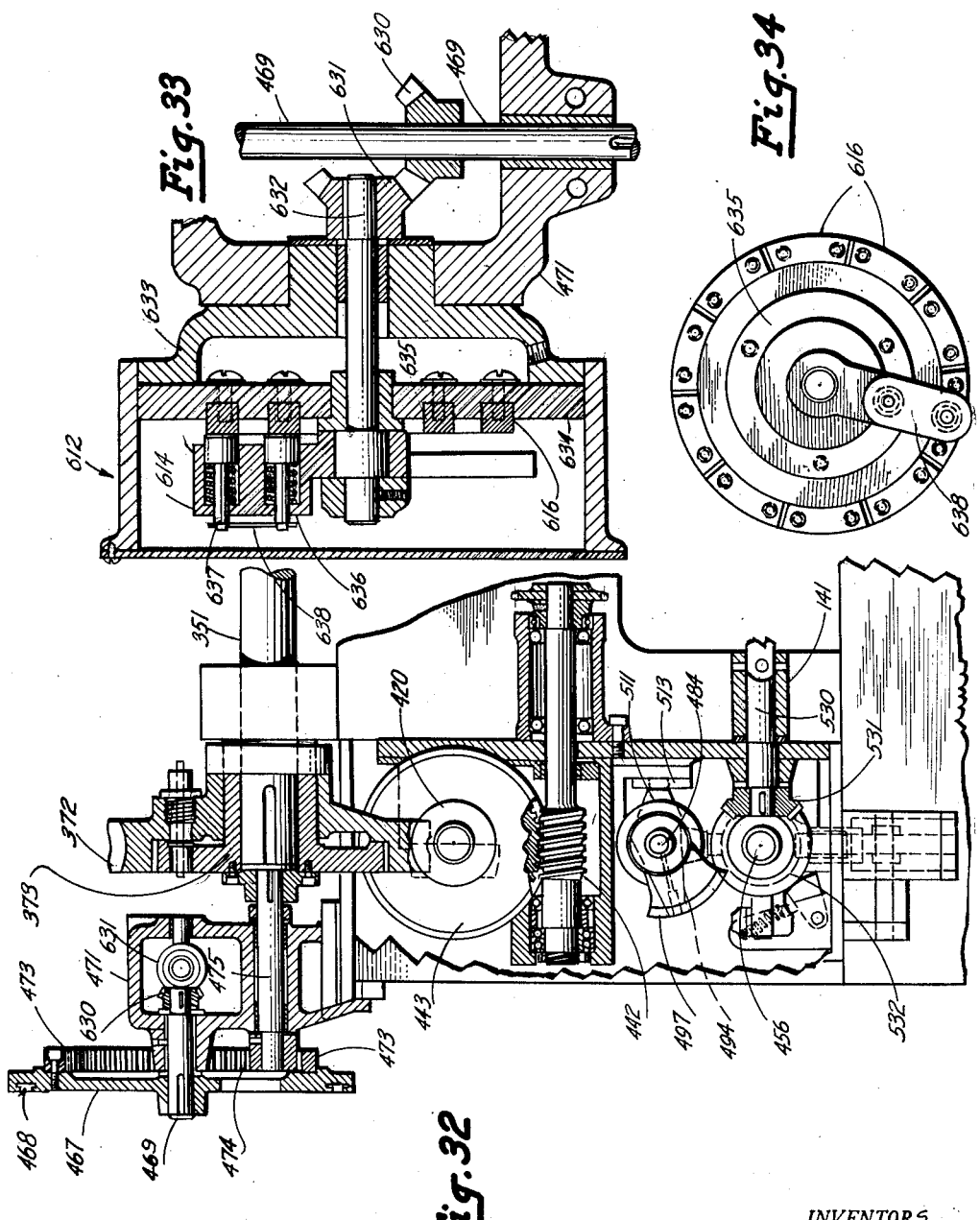

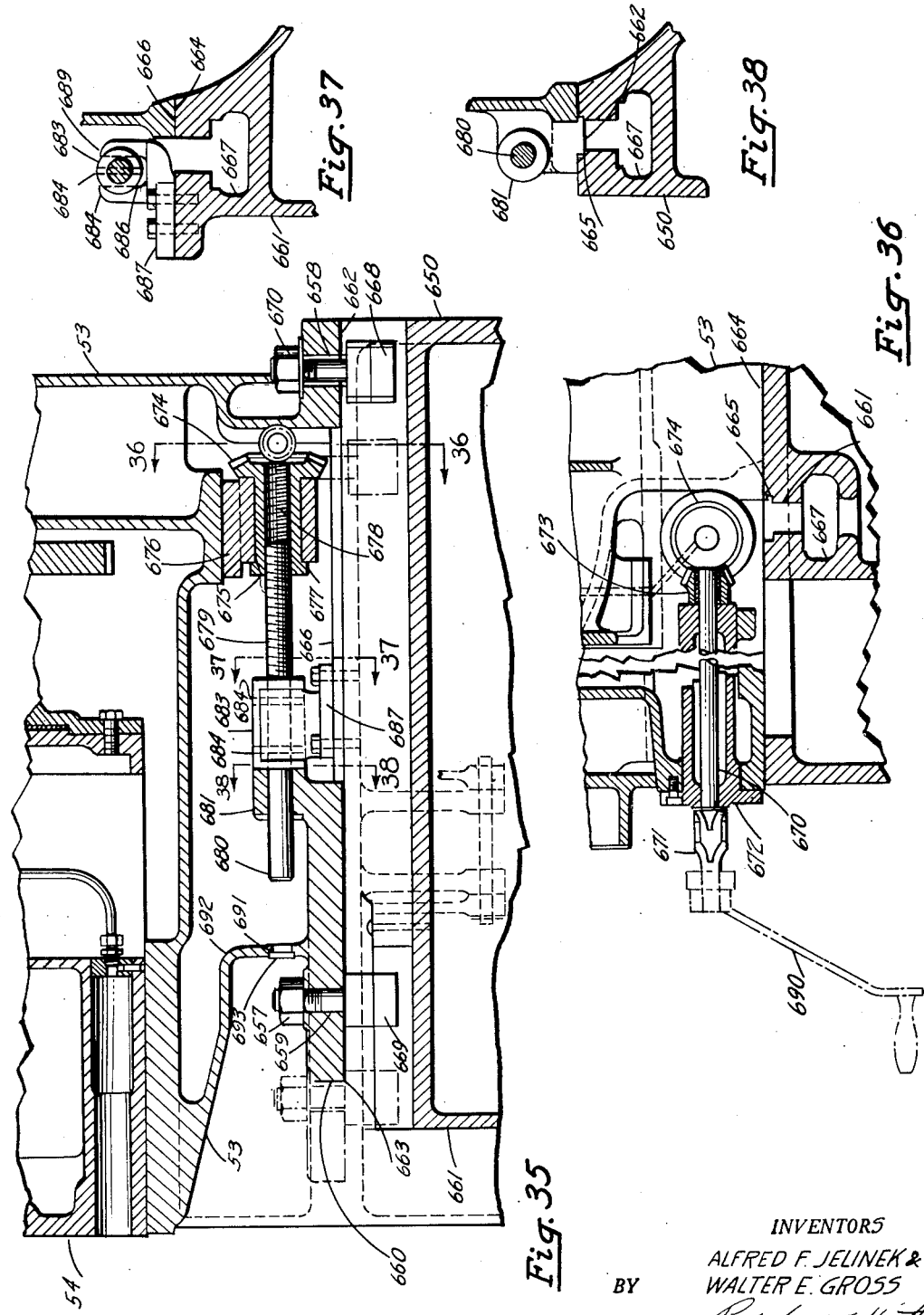

Feb. 24, 1953 A. F. JELINEK ET AL 2,629,468
TOOL FEED CONTROL
Filed Oct. 8, 1946 22 Sheets-Sheet 22

INVENTORS
ALFRED F. JELINEK &
WALTER E. GROSS
BY
ATTORNEYS

Patented Feb. 24, 1953

2,629,468

UNITED STATES PATENT OFFICE 2,629,468

TOOL FEED CONTROL

Alfred F. Jelinek and Walter E. Gross, Cleveland, Ohio, assignors to The Cleveland Automatic Machine Company, Cleveland, Ohio, a corporation of Ohio Application October 8, 1946, Serial No. 702,018

3 Claims. (Cl. 192—.02)

This invention relates broadly to machine tools and more specifically to improvements in automatic screw machines. The invention, in its broadest aspect, is directed to an improved combination of driving elements, a novel organization of control elements therefor, improvements in the stock and tool feed mechanisms and certain basic features of construction pertaining to the machine as a whole.

The objects of the invention reside in the provision of a machine which is designed to facilitate the pre-selection of feeds for each of the tools throughout the operative cycle of turret, a machine in which substantial savings may be realized in the set-up time, a structure which will produce work pieces with precision and dispatch and a machine which is more economic of operation than similar machines now in commercial use.

In detail, the objects of the invention contemplate the following utilities and advantages:

A simple and flexible multi-speed spindle drive.

A stock feed mechanism which may be readily adjusted.

Mechanism to facilitate the ready removal of the feed tube in order to accommodate substitution of pushers and collets of different size.

A structure which will produce maximum flexibility of operation without substitution of cams or alteration of mechanical parts.

An improved tool turret actuating and indexing mechanism.

Mechanism to accommodate variation of the feed during the operation of the machine.

Mechanism for the requisite feed of the tool turret relative to the work and rapid traverse therefrom.

Mechanism for disengaging the turret power feed in order to accommodate manual operation and adjustments, such mechanism being designed to effect the automatic return of the turret to its former drive condition upon disengagement of the manual operative connection.

A unit for the release of the turret feed during portions of the operative cycle thereof.

A high-speed drilling attachment for the turret together with a fluid-circulating system therefor.

A cam and follower mechanism for actuating certain of the parts of the machine within their proper sequence.

A variable speed drive for the feed mechanisms which is formed to provide infinitesimal speed changes, accurate regulation and high torque efficiency.

Other objects and advantages more or less ancillary to the foregoing and the manner in which all the various objects are realized will appear in the following description, which, considered in connection with the accompanying drawings, sets forth the preferred embodiment of the invention.

Referring to the drawings:

Fig. 7 is a plan view, partially in section, of the roll-over clutch and cam mechanism for shifting the spindle-drive clutch;

Fig. 8 is an enlarged view of a portion of the mechanism shown in Fig. 7;

Fig. 9 is a developed view of the clutch cam;

Fig. 10 is a longitudinal section of the main cam assembly;

Fig. 11 is an elevational view of the cross-slide cams;

Fig. 12 is a longitudinal sectional view of the inner end of the spindle;

Fig. 13 is a longitudinal section of the outer end of the feed tube;

Fig. 14 is a perspective view of a spring washer employed in the collet-actuating mechanism;

Fig. 15 is an elevational view of a fragmentary portion of the front of the machine illustrating the stock-feed control mechanism;

Fig. 16 is a perspective view of the feed control mechanism;

Fig. 17 is a schematic perspective view of the cross-slide actuating mechanism;

Fig. 18 is a schematic perspective view of the turret clutch manual control mechanism;

Fig. 18a is a detail view of a portion of the mechanism shown in Fig. 18;

Fig. 19 is a vertical longitudinal section of the turret and associated mechanism;

Fig. 20 is an enlarged view of a portion of the structure illustrated in Fig. 19 with the turret shown in its advanced position;

Fig. 21 is an elevational view partly in section illustrating the turret and the indexing mechanism, as viewed from the rear of the machine;

Fig. 24 is an elevation view, partly in section, of the turret operating mechanism as viewed from the right end of the machine;

Fig. 25 is an elevation of the forward end of the tool turret;

Fig. 26 is an elevational view, partially in section, of the turret locking mechanism as viewed from the left of the machine;

Fig. 27 is a detail of a cam follower lever;

Fig. 29 is an elevational view of the turret drive gearing as viewed from the right end of the machine;

Fig. 30 is a transverse sectional view of the manual control mechanism;

Fig. 31 is an elevational view, partially in section, of the turret driving mechanism;

Fig. 32 is an elevational view, partially in section, as seen from the rear of the machine, of the turret driving mechanism;

Fig. 33 is a horizontal section of the distributor mechanism;

Fig. 34 is an elevation view of a portion of the distributor;

Fig. 35 is a longitudinal section through the turret head;

Fig. 36 is a transverse section taken on the plane indicated by the line 36—36 in Figure 35;

Fig. 37 is a fragmentary section taken on the plane indicated by the line 37—37 in Figure 35;

Fig. 38 is a fragmentary section taken on the plane indicated by the line 38—38 in Fig. 35.

Figure 1:
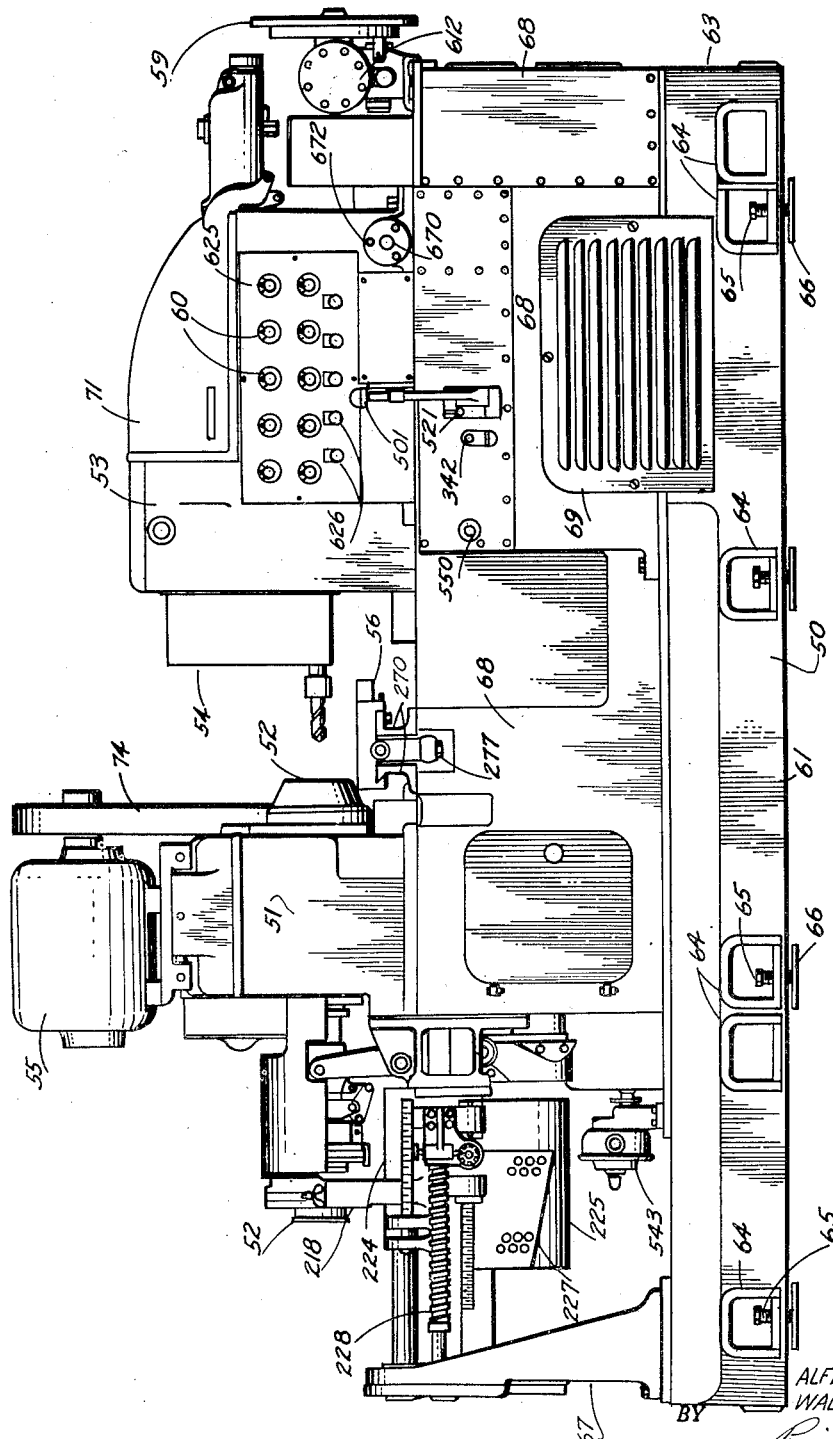
Fig. 1 is a front elevation of a single-spindle automatic screw machine constructed in accordance with the invention.

The general organization of the automatic screw machine embodying the present invention follows the prototype familiar to those skilled in the metal-working arts. Thus, as will be seen in the complete assemblies illustrated in Figs. 1 and 2, the machine comprises a bed 50 having a head stock 51 mounted thereon, a spindle 52 journalled therein, a tool-slide assembly 53 mounted on the opposite end of the bed and an indexable tool turret 54 in the tool slide disposed in coaxial relation with the spindle 52. The spindle is driven by a motor 55 through change-speed gearing supported in the head stock. The spindle assembly includes a collet and a stock pusher, both actuated by cams operated in accordance with the operative cycle of the machine. The turret-tool slide is reciprocated and indexed by mechanism supported primarily within the base of the machine. This mechanism also drives the cams that operate the stock feed, collet, cross slides 56 and 57 and an independent cutoff tool 58. The operative cycle of the machine is controlled by an adjustable control device 59 and the rate of feed by rheostat controls 60. A five-stage turret is chosen herein as an example of action of a typical form of tool holder, although the machine may readily be adapted for any desired number of turret positions.

It will be readily recognized that many features of the machine may be readily applied to other machine tools including turret lathes, multi-spindle automatic machines and turning or boring machines without departure from the structure or functional requisites of the parts or such assemblies.

In view of the complexity of the machine, the detailed description thereof will, insofar as possible, be considered under topical divisions of the assembly.

*Base*

Figure 2:
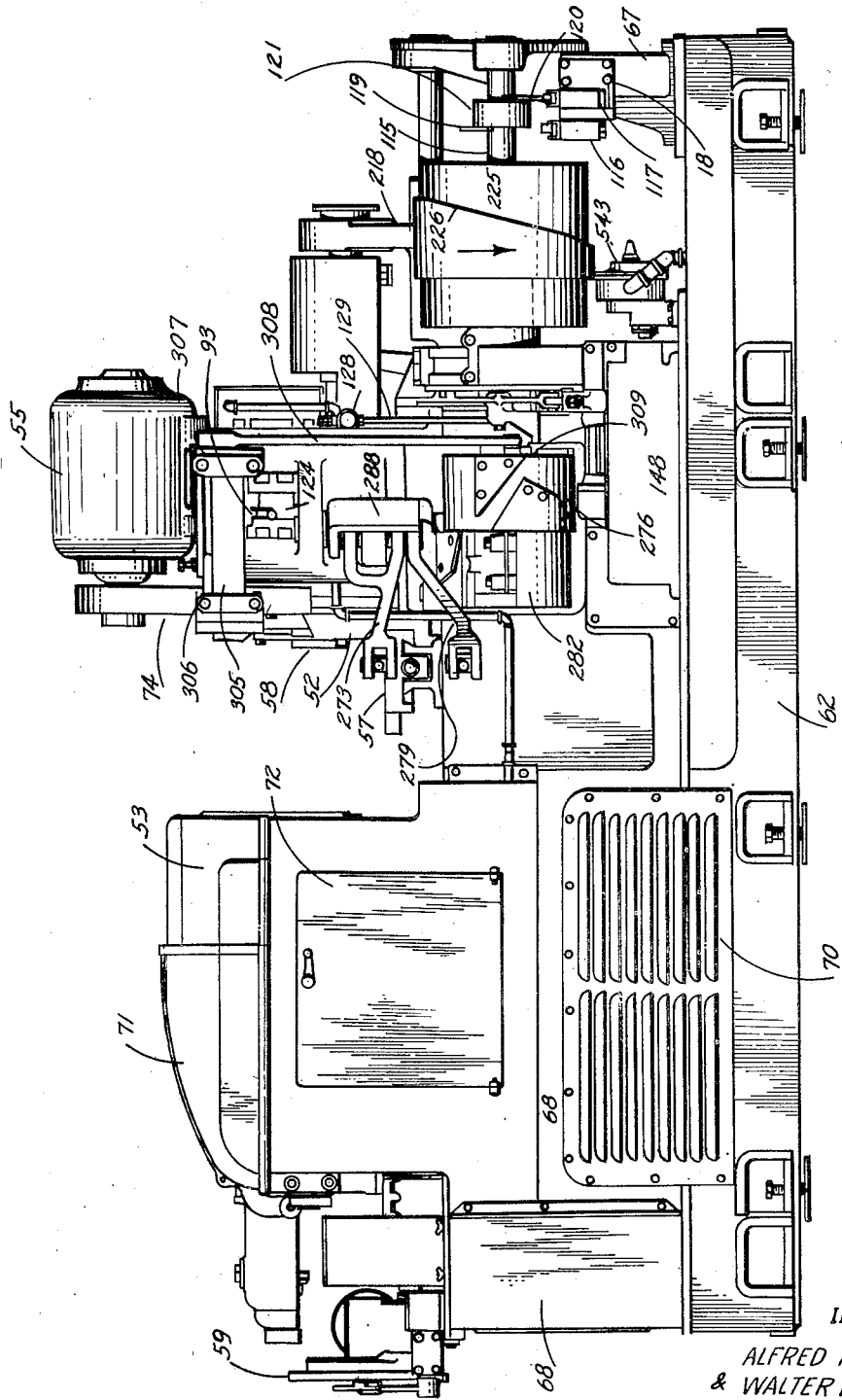
Fig. 2 is a rear elevation thereof.
Figure 3:
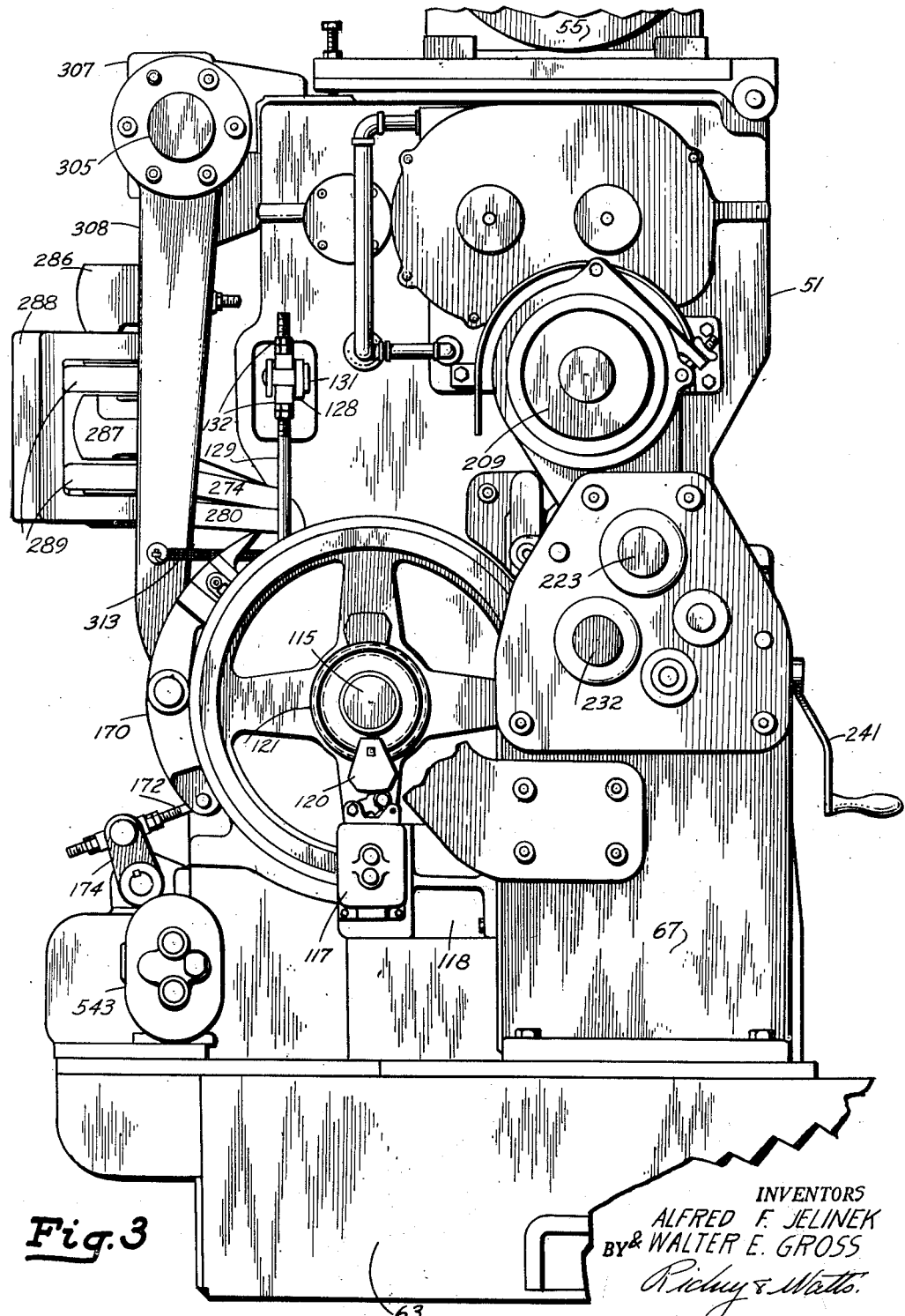
Fig. 3 is an elevation shown upon an enlarged scale of the left or spindle end of the machine.

The machine base (Figs. 1, 2, and 3) is preferably formed of pressed steel members welded together for maximum strength and rigidity which include a front frame and oil pan 61, a rear longitudinal frame and pan 62 and end cross members 63. The frame is stiffened by transverse box girders 64 having jack screws 65 mounted therein which are provided with floor plates 66. The machine may be leveled by adjustment of the jack screws during the installation thereof and certain of the girders may be used for the support of cross rails when the machine is lifted or moved about by a crane. A stanchion 67, adjacent the head stock 51, provides a support for the outboard ends of the cam shaft and the stock-feed actuating mechanisms. The working parts of the machine are enclosed in appropriate housings 68, the structural details of which form, per se, no part of the present invention. A front louver plate 69 and a rear louver plate 70 are provided to facilitate access to the turret driving motors and generators and to afford ventilation therefor. A hinged turret cover 71 and a drop plate 72 provide access to the turret mechanism.

*Spindle and spindle drive*

The spindle 52 is driven by the motor 55 through a belt 73 (Fig. 4) which is trained over a pulley 76 extending from the inner end of the head stock. The spindle, as will be seen more clearly in Fig. 5, comprises an outer tube 77 rotatably mounted in tapered roller bearings 78 and 79 in the frame 80 of the head stock. The spindle may be driven by either of two spur gears 81 and 82, the two gears constituting part of a two-speed driving element for the spindle. The gears are keyed to the spindle by a key 83 and retained thereon by a threaded collar 84.

The driven pulley 76 is keyed to a shaft 86 which is mounted in anti-friction bearings in the frame 80. A high-speed gear 89 and a low-speed gear 90 bored for the reception of ball bearings are mounted for free rotation upon the shaft 86. The gears 89 and 90 are alternatively coupled with the shaft 86 for either high or low speed operation of the spindle, by means of multiple-disc clutches 91 and 92, either of which is engaged by the sliding movement of a collar 93 mounted on a clutch sleeve 94 supported for rotation with the shaft 86.

The low-speed drive is obtained through the gear 90 which is entrained with a gear 95 keyed to a shaft 96, a pair of pick-off gears 97 and 98 mounted respectively on the shafts 96 and 99 and a pinion 101, keyed to the shaft 99 which is intermeshed with the gear 82 on the spindle.

The high-speed drive is obtained through the gear 89 which is entrained with a gear 102 keyed to a sleeve 103 concentric with the shaft 96, a demountable pinion 104 keyed to the sleeve 103, a demountable gear 105 keyed to a sleeve 106 and a gear 107 which is intermeshed with the gear 81 on the spindle. The sleeves 103 and 106 are mounted in anti-friction bearings in transverse webs formed in the body of the housing while the shafts 96 and 99 are journaled in ball bearings in the inner end of the housing and in needle bearings 108 and 109 in the outer ends of the sleeves. The pick-off gears are provided to facilitate the selection of the appropriate speed ratios for the high and low gear drives relative to the contemplated work. Access may be had to the pick-off gears 97 and 98, 104 and 105 by a removable cover plate 111.

Figure 5:
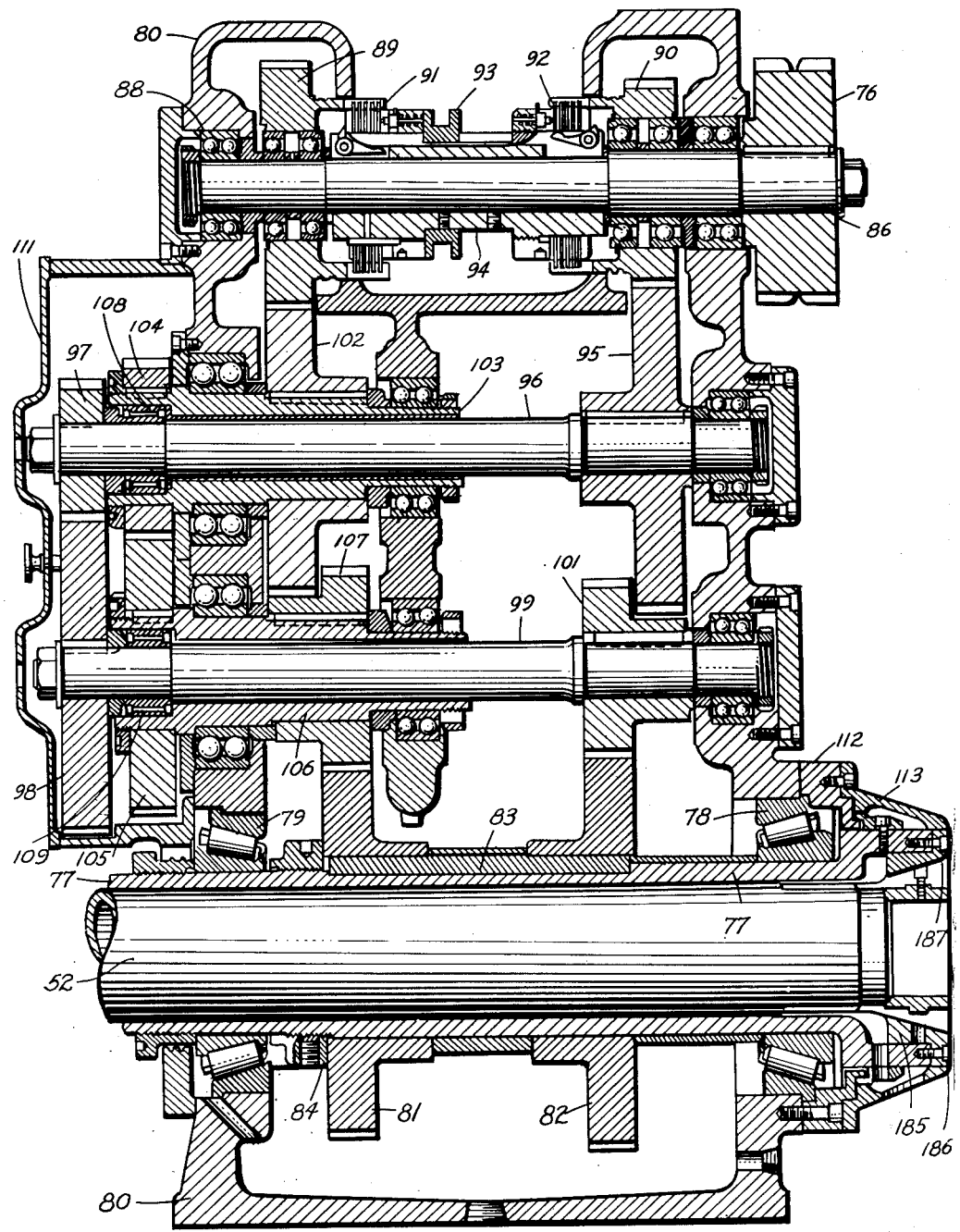
Fig. 5 is a developed view of the spindle-drive gearing.

When the clutch-control collar 93 is moved to the left, as shown in Fig. 5, the high-speed drive will be engaged and the low-speed drive gear train will run idle. When the collar is shifted to the right, the low-speed gearing will drive the spindle and the high-speed gear train will idle.

The outer race of roller bearing 78 is retained by a ring 112 secured to the head stock housing, a nose piece or guard 113 being mounted thereon to safeguard the bearing and end portion of the spindle.

In order to secure maximum flexibility of operation, a two-speed reversible motor is employed. Such a motor is of particular advantage in backing out a tap or driving the spindle at the requisite speed for a threading operation. Control of motor speed and direction of rotation thereof is effected from the main camshaft 115 (Figs. 2 and 3) which is driven from the turret feeding and indexing mechanism in such a manner as to effect one revolution for each complete operating cycle of the machine. It will be understood that the camshaft is not rotated at constant speed, the speed of the shaft being dependent upon the settings of the machine for a particular series of operations. However, a given angular position of the camshaft corresponds to a given stage for each operation on the work piece.

A motor reversing switch 116 and a motor speed control switch 117 (Figs. 2 and 3) are mounted on a bracket 118 bolted to the stanchion 67. The details of the switches and the wiring to the motor are not shown herein since they are matters of conventional electrical design which depend upon the type of current available and the type of motor selected for the spindle drive. The switches 116 and 117 are actuated by cam plates 119 and 120, respectively, (Figs. 2, 3 and 10) bolted at suitable points on the T-slotted faces of a drum 121 secured to the camshaft 115. When the cam 119 depresses the actuating lever of the switch 116, the motor is reversed and when the cam 120 engages the actuator of the switch 117, the motor speed is reduced, ordinarily to half its normal R. P. M. although other motor speed ratios are obtainable. The operative period of the cams may be varied by the selection of cams of an appropriate length of arc. In operation where no speed or directional control of the motor is required, the cam plates 119 and 120 may be removed.

*Spindle speed-change clutch actuation*

Figure 6:
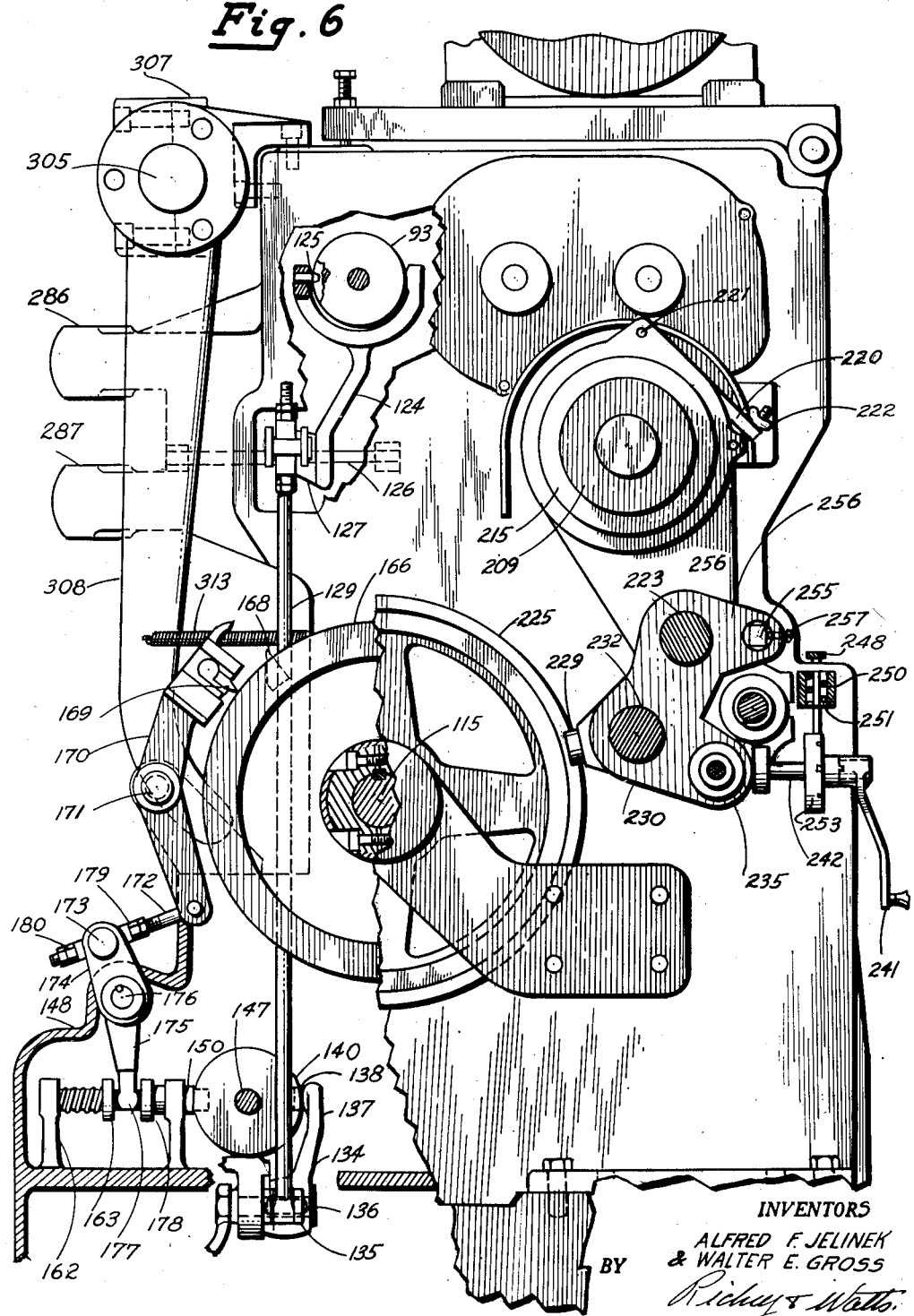
Fig. 6 is an elevational view of the head stock as viewed from the left, with portions thereof broken away and shown in section in order to illustrate the spindle-drive clutch-actuating mechanism and a part of the stock-feed apparatus.
Figure 22:
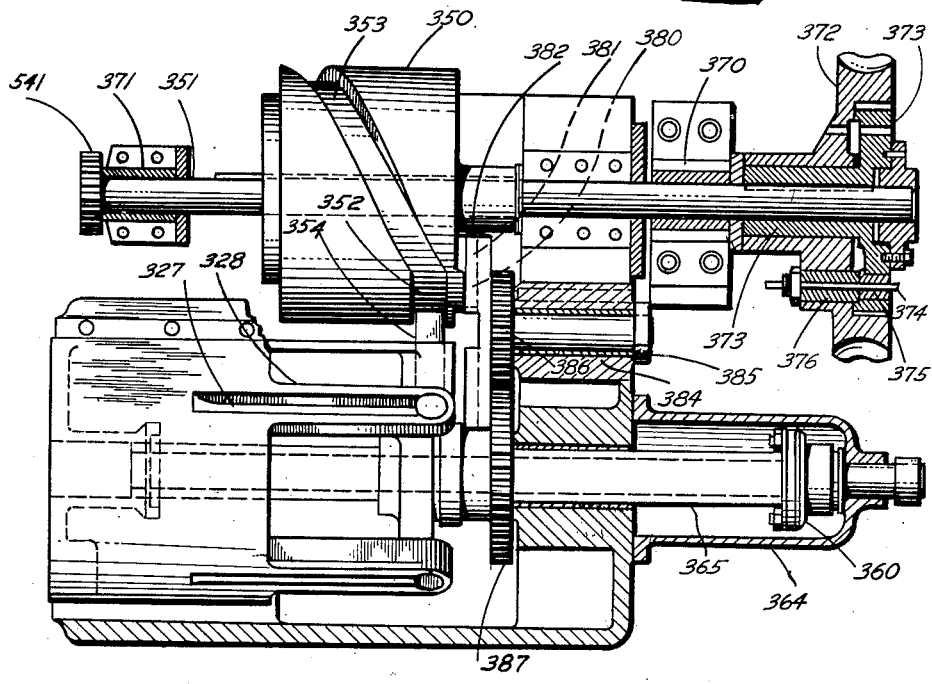
Fig. 22 is a developed view of the turret and the feed mechanism therefor.
Figure 23:
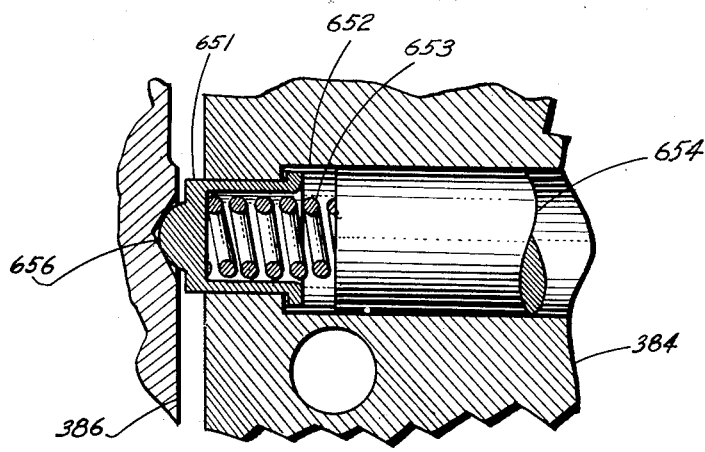
Fig. 23 is a detail in section of the turret indexing detent.

As pointed out above, high and low speed spindle drive is selected by shifting the collar 93 into engagement with either of the clutches 91 or 92 (Fig. 5). The collar 93 is actuated by an upwardly directed arm 124 (Figs. 2 and 6) of a bell crank lever, the arm being formed with a clevis bearing pin 125 thereon which engages a circumferential groove in the collar. The bell crank is pivoted on a shaft 126, the second arm 127 thereof being disposed laterally and terminating in a clevised end portion 128. A vertical operating rod 129 (Figs. 3 and 6) actuates the bell crank lever through a pin 131 which passes through the end of the lever arm 127. The pin 131 may be adjusted longitudinally of the rod 129 through actuation of nuts 132. The rod 129 is reciprocated by a bell crank 134 (Figs. 6 and 7), the horizontal arm 135 thereof being pivotally connected to the lower end of the rod through a clevis pin 136. The vertical arm 137 of the bell crank supports a roller 138 which is engaged within a groove 139 (Figs. 7 and 8) in a cam drum 140. The groove 139 is designed to effect the engagement of the clutch for high-speed drive, as shown in Fig. 7; and when rotated one hundred and eighty degrees (180°), effect the engagement of the clutch for low-speed drive as shown in Fig. 8.

Power for actuation of the clutch shifting mechanism is transmitted from a constant speed motor in the base of the machine at the tool slide end thereof through a universal joint 141 and 142, a drive shaft 143, a sleeve or coupling 144, a shaft 145 and through a universal joint 146 to the clutch operating shaft 147 within the housing 148 in the rear of the machine. The shaft 147, which is rotated continuously, is journaled in brackets 149 formed in a housing for the clutch actuating mechanism. The shaft 147 drives the cam 140 through a half-turn clutch and power-stop mechanism, known commercially as a "roll-over clutch," which is controlled by a plunger 150 (Figs. 7 and 8) coacting with the driven clutch member 151. The driven clutch member 151 is formed with teeth 154 on one face thereof which cooperate with teeth 155 on the adjacent face of a driving clutch member 156 pinned to the shaft 147. The shifting cam 140 is coupled to the clutch member 151 through the interengagement of tenons 157 on the cam with radial slots 158 in the clutch member 151. A coil spring 159 compressively retained between the driven clutch member and the cam urges the member 151 into engagement with the driving clutch member 156. The clutch, however, is normally held disengaged by the plunger 150 which is retained in the narrow end 160 of one of two circumferential slots 152 (Figs. 8 and 9) of the driven clutch member by a spring 161 compressed between an upright frame member 162 and a collar 163 secured upon the plunger.

When the plunger is withdrawn from the clutch under the influence of a cam which is driven in timed relation with the clutch, the spring 159 causes engagement of the clutch with the driven member and effects the rotation thereof. Immediately thereafter, the plunger 150 is released by the wedge portion 153 of the cam and drops into the slot 152 opposite the one in which it was previously retained. Continued rotation of the clutch brings an inclined face 164 of the cam track into engagement with the plunger, where, upon continued rotation of the driven member, the plunger will be biased against the effect of the spring 159 and cause the disengagement of the clutch. The inertia of the mechanism will cause the driven members to continue to rotate until movement thereof is arrested by engagement of the plunger 150 within the end 160 of the slot 152.

The timing mechanism for the clutch control unit comprises a drum 166 (Figs. 6 and 10), fixed upon the camshaft 115 and formed with a T-slot 167 in the face thereof for the reception of dogs 168 which may be clamped thereon in any desired spaced relation. Since the drum 166 makes one revolution during each operative cycle of the machine, any number of dogs 168 may be mounted on the drum to effect the clutch actuation at the desired points within the cycle. The dogs 168 cooperate with a spring pressed follower 169 on the end of a lever 170 pivoted on a stub shaft 171 supported in the frame of the machine. A pull rod 172, pivoted on the lower end of the lever 170, passes through a pin 173 which is retained in the yoked end of a lever 174. The lever 174 and a dependent arm 175 are keyed to a shaft 176 which is rotatably mounted in the frame. The clevised lower end 177 of the arm 175 is received between the collars 163 and 178 fixed on the clutch latch plunger 150. Adjustment of the linkage may be effected by altering the position of the nuts 179 and 180 to move the pin 173 longitudinally along the pull rod 172.

During the rotation of the drum 166 when a dog 168 engages the follower 169, the lever 170 will be rocked, thus causing pull rod 172, the lever 174 and arm 175 to retract the plunger 150 and permitting the roll-over clutch to operate in the manner heretofore described. Since the dog 168 passes rapidly under the follower 169, the latch 150 will return to its holding position before appreciable rotation of the clutch. Although the roll-over clutch described herein will perform the function in a highly satisfactory manner, it is to be understood that other mechanisms may be substituted therefor.

Chucking mechanism

The machine, according to the invention, embraces a chucking device or collet for holding the stock during the working cycle. As is customary, the collet is automatically released at the end of each operative cycle of the machine in order to accommodate the advance of the stock into working position. The spindle comprises a tube 77 (Figs. 5, 12, and 13) rotatably supported in antifriction bearings in the end walls of the head stock. The inner end of the spindle is provided with a hardened bearing 185 retained by cap screws 186 and formed with a conical bore therein which constitutes a cam surface for effecting the closure of the spring fingers of the collet. The collet 187 is mounted for sliding movement in the bearing 185 and the inner end thereof is threaded in a collet tube 188 within the spindle 77. Retraction of the collet tube effects the release of the collet fingers from the stock.

The mechanism for reciprocating the collet tube is illustrated in Fig. 13. In the upper portion of this figure, the collet-operating mechanism is shown as adjusted to effect the release of the chuck or collet while in the lower portion of the figure, the mechanism is shown as adjusted to effect the clamping action of the collet. The collet is operated by reciprocation of a collar 189 having a key 190 thereon which is received within aligned slots in the spindle and collet tubes. With such construction, the collar is constrained to rotate with the spindle but may reciprocate longitudinally relative thereto. The collar 189 is formed with equi-spaced radial ears 191 which support toggle mechanisms for reciprocating a sleeve 192. Each toggle mechanism comprises a bell crank 193 pivotally mounted upon a ring 194 keyed to the spindle tube 77. The bell crank 193 is coupled to the collar 191 by a link 195 and to the sleeve 192 by a link 196. As will be apparent from the drawings, when the collar 189 is moved to the left, the toggle i. e. one arm of the bell crank 193 and the link 196 will be extended and move the sleeve 192 a relatively small distance to the left. A flange 197 which is fixed upon the collet tube is coupled to the sleeve 192 through a spring washer 198, shown also in Fig. 14. The spring washer is formed with convergent faces, the wall thickness adjacent the center thereof being designed to afford a limited degree of flexure. The washer 198 is retained by a thimble 199 secured to the periphery of the sleeve 192 and by the opposed end walls of the sleeve and flange 197. In the released position of the collet, the washer 198 is held at its outer edge between an inturned bead in the face of the thimble 199 and the outer portion of the face of the sleeve 192. When the sleeve is moved to the left to close the collet, an annular shoulder 201 on the sleeve bears against the washer adjacent the inner marginal edge thereof, forcing the washer and collet tube to the left and drawing the collet into the conical bearing 185. The spring 198 is formed with sufficient flexibility to yield under the application of thrust initiated by oversize stock in the collet. In order to accommodate work pieces of various size or shape, adapters 202 may be mounted in the counter-bored end of the collet.

Mechanism for reciprocating the collar 189 comprises a yoke 203 (Fig. 15) having bearing pins therein which are engaged within a circumferential groove 205 in the periphery of the collar. The yoke 203 is pivoted on a shaft mounted in the machine frame and is formed with a depending arm 204, the lower end of which supports a cam follower 205a engaged with a drum cam 206 (Figs. 10 and 15) which is keyed to the camshaft 115. The drum 206 is provided with track segments which are configured to oscillate the arm 204 and in turn the collar 189 into collet-releasing position and at the appropriate point in the operative cycle of the machine into collet-closing position

Stock feed tube

The mechanism for advancing the stock after the cutoff operation has been completed comprises a feed tube 210 (Figs. 12 and 13) slidably mounted within the collet tube 188 and terminating adjacent the outer end thereof. As is customary, the pusher 211 is threaded in the end of the tube 210 to accommodate the ready removal thereof when setting up the machine for stock of different size. As shown herein, the pusher is provided with an annular recess 212 in the outer end thereof for the reception of pads or bushings of the requisite size. A collar 209 is provided on the outer end of the tube 210 for the support of a ball bearing 213 which is restrained against longitudinal movement by a shoulder on the collar and a nut 214 threaded on the shank thereof. The outer race of the bearing is retained within a cup 215 formed with a groove 216 in its outer surface and threaded for the reception of a retaining nut. The cup is supported in a bore 217 in bracket 218 (see also Fig. 15) mounted for longitudinal reciprocation upon guide rods supported by the stanchion 67 and the head stock housing. The cup 215 is keyed to the bracket 218 by a bar 220 having an arcuate inner face therein (Figs. 6 and 15) hinged on a pin 221 and normally retained in its operative position by a thumb nut 222 threaded upon an eye bolt pivoted on the bracket. The feed tube 210 may be readily removed for replacement of the pusher by release of the thumb nut 222, elevation of the bar 220, and retraction of the feed tube.

Stock feed control mechanism

In machines of this type, the work is customarily fed against a stop which may be mounted in the turret or pivotally supported upon the bed of the machine. In practice, the stock-feed mechanism is retracted throughout the operative cycle of the machine and advanced immediately after completion of the last machining operation in the cycle. It is essential in machines of this character to provide a stock-feed mechanism that will operate with a minimum of shock, that will inhibit undue rebound, and that will be quick and positive of action. Furthermore, it is highly desirable that the mechanism be designed to facilitate adjustments for feeding of any desired length of stock within the capacity of the machine and to minimize sliding movement of the pusher feed fingers over the stock after engagement thereof with the stop.

The feed control mechanism of the present invention contemplates a structure which is designed to meet the foregoing prerequisites. In general, this structure comprises a crosshead 224 (Figs. 1 and 2) which is actuated by a drum feed cam 225 keyed to the main camshaft 115 and rotated therewith. The direction of rotation of the drum is counterclockwise as viewed from the spindle end of the machine. The cam track on the drum 225 is formed with a portion 226 of a relatively fine pitch which effects the gradual retraction of the feed tube during the working cycle of the machine. The track is further formed with a cam surface 227 of a steep pitch which permits the rapid translation of the feed tube under the influence of a compression spring 228 during the stock-feed operation. The cam follower roller 229 (Fig. 6) is adapted for longitudinal adjustment relative to the crosshead 224 to vary the stroke of the feeding mechanism.

In further detail, the cam follower roller 229 (Fig. 6) is mounted on a slide 230 (Figs 6, 15, and 16) reciprocable on rods 223 and 232, supported in the stanchion 67 and the outer end of the machine housing. The slide 230 comprises a cylindrical bearing block bored for sliding movement on the guide rod 232 and formed with an upwardly and outwardly disposed arm 234 machined to envelop the upper guide rod 223 in order to restrain rotational movement of the slide. The block is further formed with a lug 235 integral therewith which is bored to receive a threaded wear bushing for the reception of a lead screw 236. The unthreaded inner end 237 of the screw 236 is journaled in an outwardly-depending arm 238 formed on the cross head 224 and is restrained from longitudinal movement relative thereto by the collars 239 and 240. The unthreaded portion 237 of the screw forms the connection between the cam follower slide 230 and the crosshead 224 to effect the conjoint reciprocation of the two members of the assembly. By rotating the shaft 237, the cam follower 229 may be adjusted in longitudinal relation with the crosshead, thereby varying the position of the cam follower and in turn the ultimate movement of the feed tube. Thus, the farther the cam follower is shifted to the left in Figs. 15 and 16, the smaller the effective portion of the cam 225 and the smaller the stroke of the feeding mechanism.

The threaded shaft 237 may be rotated to effect the adjustment of the feed by a hand crank 241 engageable with a shaft 242 journaled in a bracket 243 which is bolted to the arm 238 of the crosshead 224. A bevel gear 246 fixed upon the inner end of the shaft 242 is intermeshed with a bevel gear 247 which is formed on the collar 240 affixed upon the threaded shaft 237. The shaft 242 is normally restrained against rotation by a locking pin 248 mounted for vertical sliding movement in a boss 249 in the bracket 243 and biased downwardly by a compression spring 250 (Fig. 6) acting against a collar 251 on the plunger. The plunger is engaged in one of a plurality of notches 252 formed in a collar 253 fixed upon the shaft 242. When it is desired to alter the stroke of the feed mechanism, the crank 241 may be released by retraction of the plunger 248 and the shaft 237 then rotated to move the cam follower 233 to the right or left relative to the crosshead 224.

For convenience in setting the feed mechanism, a scale 255, graduated in inches or any other suitable unit, may be mounted on the cam slide 230 preferably in a lug 256, anchored by a screw 257 and with the free end thereof mounted for sliding engagement in an opening in a lug 258 on the crosshead 224.

The spring 228 which provides the driving effort for the advancement of the stock is telescopically engaged with a rod 260 (Fig. 15) supported in the stanchion 67 and in the arm 238 of the crosshead 224. The spring is impinged between the closed end 262 of a tube 263 and a collar 265 fixed on the rod 260 adjacent the stanchion 67. The tube 263 is secured against longitudinal movement in the arm 238 by the flanged end 264 thereof. It will be noted that the length of the spring 228 is approximately three times the length of the maximum translation of the feed mechanism so that the spring load thereon will be relatively uniform throughout the actuation thereof.

In the operation, the cam follower 233 is adjusted relative to the crosshead 224 by means of the screw 236 and reference to the scale 255 to obtain the desired stroke. During the working cycle of the machine, the cam 225 makes one revolution, hence, at some point during such cycle as determined by the stroke setting of the cam follower, the portion 226 of the cam track will engage the roller 229. The follower will then draw the crosshead 224 and feed tube 210 to the left, i. e. the inner end of its feed stroke. Immediately after the final operation of the last tool in the machine cycle, the arm 204 will be actuated by the cam 206 and effect the release of the collet. As the roller 229 passes over the peak of the cam track 226, the spring 228 will move the stock-feed mechanism to the right thus advancing the stock. The speed of translation of the stock feed is controlled by the angle of the portion 227 of the cam.

*Cross-slide mechanism*

The machine is preferably provided with a front cross slide 56 and a rear cross slide 57, actuated in timed relation with the other mechanisms in the machine by the camshaft 115. The cross slide operating elements are shown in detail in Figs. 2, 3, 4, 10 and 11 and illustrated schematically in Fig. 17. With reference to Fig. 17, it will be seen that the rear cross slide 57 is mounted on ways 270 disposed in transverse relation to the spindle axis and that the slide is actuated by a link 271 pivoted thereto and to the clevised end 272 of an arm 273 of a bell crank. The second arm 274 of the bell crank is provided with a roller 275 engaging a cam 276. The front cross slide 56 (Fig. 1), is connected by a link 277 to a clevis 278 formed in a bell crank 279, the arm 280 of which supports a roller 281 which engages a feed cam 282. The bell cranks are pivoted on a pin 285 supported in brackets 286 and 287 (Figs. 3, 4, and 6) on the rear of the spindle head 51. As will be seen in Figs. 2, 3, and 4, the levers 278 and 279 are formed with bifurcated bearings, one arm of each of the furcations being disposed between the brackets 286 and 287 while the other arms thereof are located below the bracket 287. The fulcrum 288 of the front cross-slide actuating lever embraces the fulcrum 289 of the rear slide lever.

Figure 4:
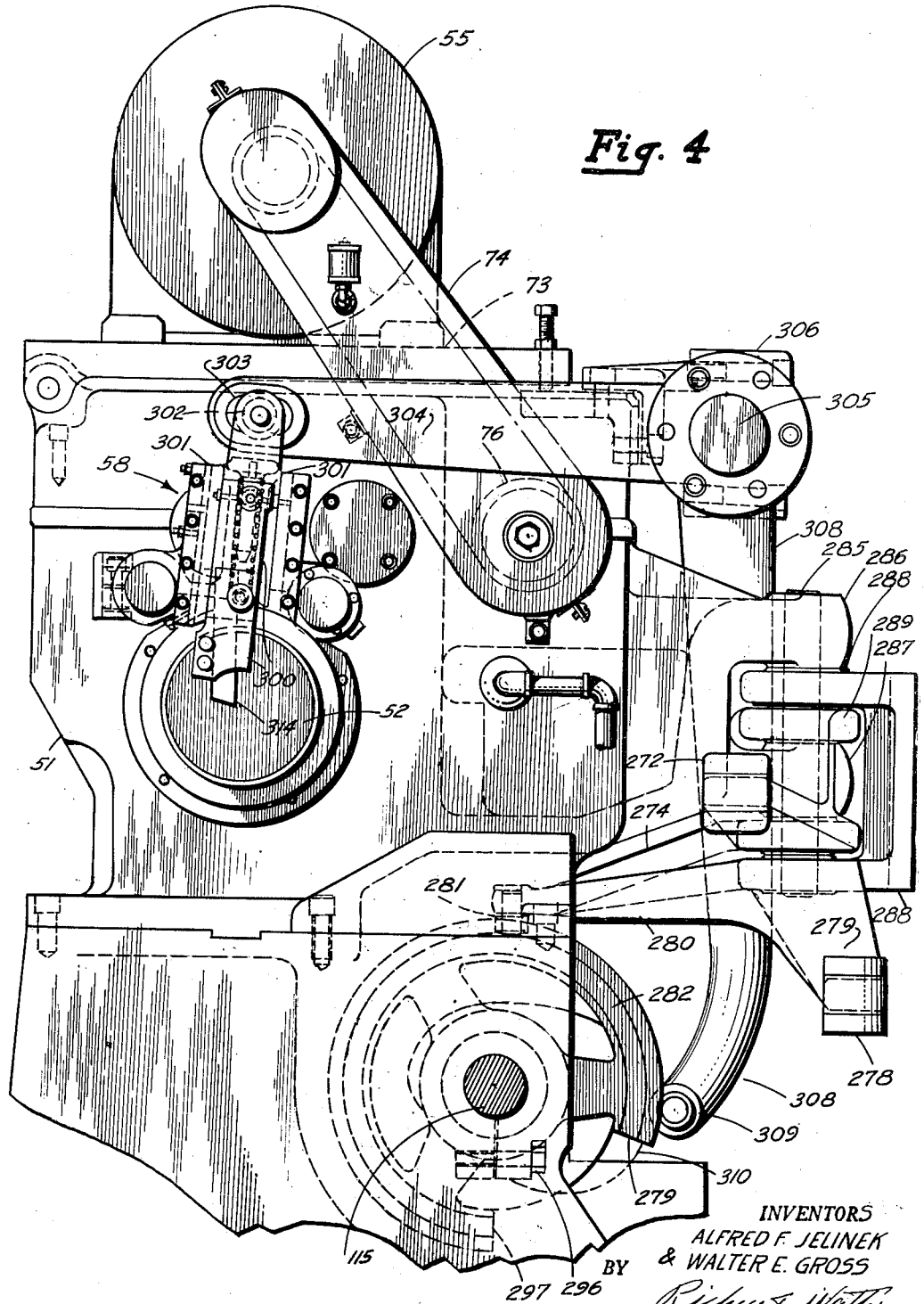
Fig. 4 is an elevation shown on an enlarged scale of the right or inner end of the headstock.

The cross slide actuating cam drums 282 and 276 are provided with split hubs 295 (Fig. 11) clamped by cap screws 296 to sleeves 282a and 286a (Fig. 10) keyed to the cam shaft 115. In order to facilitate access to the cap screws, a portion of the circumferential face of each drum is cut away to form an opening 297 (Fig. 4). By loosening the cap screws 296, the drums may be rotated relative to the shaft in order to position the cams thereon to the requisite timed order of operation during the operative cycle of the machine. The cross-slide cam drums are provided with cam plates 298 and 299 to effect the reciprocation of the follower rollers and the consequent operation of the cross slides.

*Independent cutoff mechanism*

An independent cutoff tool 58 (Figs. 2 and 4) may be provided to free the cross slide mechanisms for other operations and thus increase the flexibility of the machine. The operating mechanism for the cutoff tool 58 as illustrated in Figs. 2, 3, 4, 6, 10, and 11 includes a tool slide 300 reciprocable in substantially vertical ways 301 secured to the inner face of the head stock housing 51. The upper end of the slide 300 is provided with a roller 302 (Fig. 4) received in an opening 303 in the end of actuating arm 304. The arm 304 is fixed upon a shaft 305 journaled in brackets 306 and 307 on the rearward face of the head stock. A second arm 308 secured to the outer end of the shaft 305 is provided with a roller 309 (Fig. 4) which engages a cutoff operating cam 310. A spring 313 (Fig. 3) maintains the cam follower in engaged relation with the cam and urges the cutoff tool out of contact with the work piece. The cam 310, which is of a radial type, is mounted in a circular groove in a disc 311 fixed on the camshaft 115 (Fig. 10). The cutoff tool 314 may be brought into operation at the desired point with the operative cycle of the machine by adjustment of the cam 310 relative to the camshaft.

*Tool turret*

The tool turret slide 54, shown in advanced position in Fig. 1, is mounted in the housing 53 for reciprocation and for indexed movement to present each tool in the various tool stations to work piece. The turret and the feed and index mechanisms therefor are illustrated in detail in Figs. 19 to 26 inclusive. The turret is of cylindrical form and is mounted in a bearing 320 in the forward portion of the turret head. The openings defining the tool stations 321 are disposed in parallel relation with the axis of the turret and in equi-spaced relation with each other. The stations are also disposed for alignment with the spindle as the turret is indexed into operative position. The forward face 322 of the turret is formed with a central opening 323 which may be closed by a plate 324 retained by screws. The plate may, however, be removed for installation of a tool holder or high-speed drilling attachment of any conventional form. Radial openings 325 disposed in eccentric intersecting relation with the openings 321 (Figs. 21 and 25) are provided in the turret for the reception of studs for clamping the tools in place.

The turret is locked against rotation during periods of operation of the tools by a wedge 326 (Fig. 26) which is adapted for successive reentrant engagement with a series of grooves 327 in arms 328 in the rearward portion of the turret. The locking wedge 326 is formed on the end of a hollow plunger 329 reciprocable in a bushing 330 in a housing 331 constituting a portion of the turret head frame. The wedge is actuated by an inner plunger 332 mounted in a central opening in the plunger 329 and secured therein by a transverse pin 333. A compression spring 334 is mounted intermediate the head of the plunger 332 and an end 335 of the housing 331 to urge the locking wedge into the grooves 327. The wedge may be retracted by a lever 336 having a clevised end 337 thereon which engages a collar 338 retained on the outer end of the plunger 332 by a nut 339. The lever 336, which is pivoted on a stub shaft 340 fixed in the machine frame, is formed with an arm 341 which may be engaged by a hand lever 342 pivoted on a sleeve 502. As will be seen in Fig. 1, the lever 342 protrudes through the forward cover plate of the machine and is disposed for ready accessibility to the machine operator. This lever is provided to facilitate the release of the turret indexing mechanism during setup adjustments of the machine. The locking wedge 326 is retracted incident the turret indexing operation by a full automatic control mechanism therefor. The grooves 327 are of sufficient length to permit engagement of the wedge throughout the reciprocative movement of the turret slide.

The tool turret is reciprocated by a drum cam 350 (Figs. 21 and 22) keyed to a shaft 351 which is rotated continuously during the operation of the machine. The circumferential face of the drum 350 is formed with a groove therein which is configured to define a dwell 352 of zero lead for the control of the turret during the indexing operation, a helical section 353 for the control of the forward translation of the turret and a helical section 350 of an opposite lead for the control of the reverse movement of the turret. Rollers 354, corresponding in number to the index positions of the turret, are mounted for operative engagement in the cam groove. The rollers 354 are supported on the outer ends of plungers 335 (Fig. 19) which are retained in radial bores in lugs 358 formed in a plate 356 bolted upon the turret. The lugs 358 are split throughout their length and cross drilled for the reception of studs 357 for clamping the plungers in their operative position within the cam groove or in retracted non-indexing position. With this structure, the plungers for such tools as are not required in a particular setup may be locked in a retracted position so that the turret will index but remain in its retracted position during its index period.

In order to prevent drifting of the turret when disengaged from the cam, a stop mechanism is provided which, as shown in Fig. 19, comprises a disc 360 having a circumferential groove 361 therein for the reception of a plunger 362 mounted in a sleeve 363 secured to a bracket 364 constituting an extension of the turret head frame. The disc 360 is mounted on axial tube 365 which is fixed within the opening 323 in the turret for reciprocation therewith. When the turret is advanced by the cam 350, the detent plunger 362 is forced outwardly against the pressure of a spring 366, permitting the turret to advance. When the turret is returned, the detent mechanism effects the retention thereof until the positive action of the cam 352 overcomes the spring-pressed plunger 362.

*Turret indexing mechanism*

The indexing and reciprocative movements of the turret are performed by the turret operating shaft 351 (Figs. 21, 22 and 32) which is supported in bearings 370 and 371 mounted in the frame of the machine. This shaft is driven by a worm wheel 372 mounted on a sleeve 373 keyed to the shaft 351. The worm wheel 372 and sleeve 373 are rotatively driven by a shear pin 374 mounted in bushings 375 and 376 in the sleeve and worm wheel respectively.

In a five-station machine, such as disclosed herein, the worm wheel 372 and turret-operating shaft 351 make five revolutions for each complete operative cycle of the machine. Rotation of the cam 350 by the shaft 351 advances the turret in the manner heretofore described. In order to index the turret, an intermittent gear mechanism is provided which is operatively controlled by the cam roller 380 in the faces of the drum 350 (Fig. 24). The intermittent gearing is operated by an indexing roll 380 (Fig. 24) mounted on the rearward face of the cam drum 350. The roll 380 is engaged within slots 381 formed in a Geneva wheel 382 rotatably mounted on a shaft 383 journaled in a bearing 384 and retained by a collar 385. A pinion 386 pinned to the Geneva wheel 382 meshes with a spur gear 387 which is connected to the turret to effect the indexing movement thereof. Since the Geneva wheel 382 is provided with four slots, it makes one-quarter turn during each indexing operation. The ratio of gears 386 and 387 is four to five so that the gear 387 makes one-fifth of a revolution during each indexing operation. Referring to Fig. 19, the spur gear 387, which is rotatable on a bushing 388 on the tubular shaft 365, is formed with a hub portion 389 having a gear clutch member 390 on the end thereof. The clutch member 390 engages an internal gear clutch member 391 bolted to the disc 356 on the tool turret 54. When the turret is advanced, the clutch members 390 and 391 are separated but the turret is held against rotation by the locking dog 326 previously described.

The gear 387 is retained against axial movement by a fixed plate 650 disposed in abutting relation with the face of the gear.

The Geneva wheel 382 and associated gearing are held against rotation when the roll 380 is in the disengaged position by a detent (Figs. 21 and 23) which comprises a domed plunger 651 mounted in a bore 652 in the bearing bracket 384. The plunger 651 is urged against the face of the gear 386 by a compression spring 653 retained by a rod 654 mounted in the bore 652 by a set screw 655. The detent engages shallow notches 656 in the face of the gear 386.

The turret latch-releasing lever 336 (Fig. 26) is operated from the turret-operating shaft 351 by a radial cam 400 mounted on the face of the turret-operating drum 350. The cam 400 embodies an elevated portion 401 which coacts with a roller 402 (Fig. 27) on one end of a rocker arm 403 pivoted in the turret head. A pin 405 is mounted for pivotal movement in the clevised upper end 406 of the rocker arm 403. The pin is cross drilled for the reception of a push rod 407 which may be longitudinally adjusted therein by nuts 408 on the threaded end of the rod. The push rod is further coupled to the lever 336 by a pin 409 mounted in the lever 336 and in the clevised end portion 410 of the rod. Since the cam 400 makes one revolution for each index movement of the turret, the locking wedge 326 will be retracted during each indexing operation and will be reengaged in the appropriate slot 327 prior to the advance movement of the turret.

*Turret-operating shaft and camshaft power drive*

In the machine described herein, simplicity of structure is realized by the use of a single set of cams for actuating the turret feed, cross slides, stock feed and other elements of the machine. As contemplated herein, no special cams need be provided when the machine is operated for the production of a relatively small number of like parts. In large runs, however, cams of a modified shape or form may be installed. In order to obtain maximum speed of operation of the machine, it is essential that each turret tool be moved into engagement with the work and away therefrom in the shortest possible time and also moved at the appropriate rate of feed during machining operations. To meet these objectives, the machine is provided with a rapid traverse drive of constant speed and a decelerated feed drive of variable speed. The machine is further provided with an automatic control mechanism for shifting from rapid traverse to pre-selected feed rates and then to rapid retraction at appropriate points in the work cycle.

Figure 28:
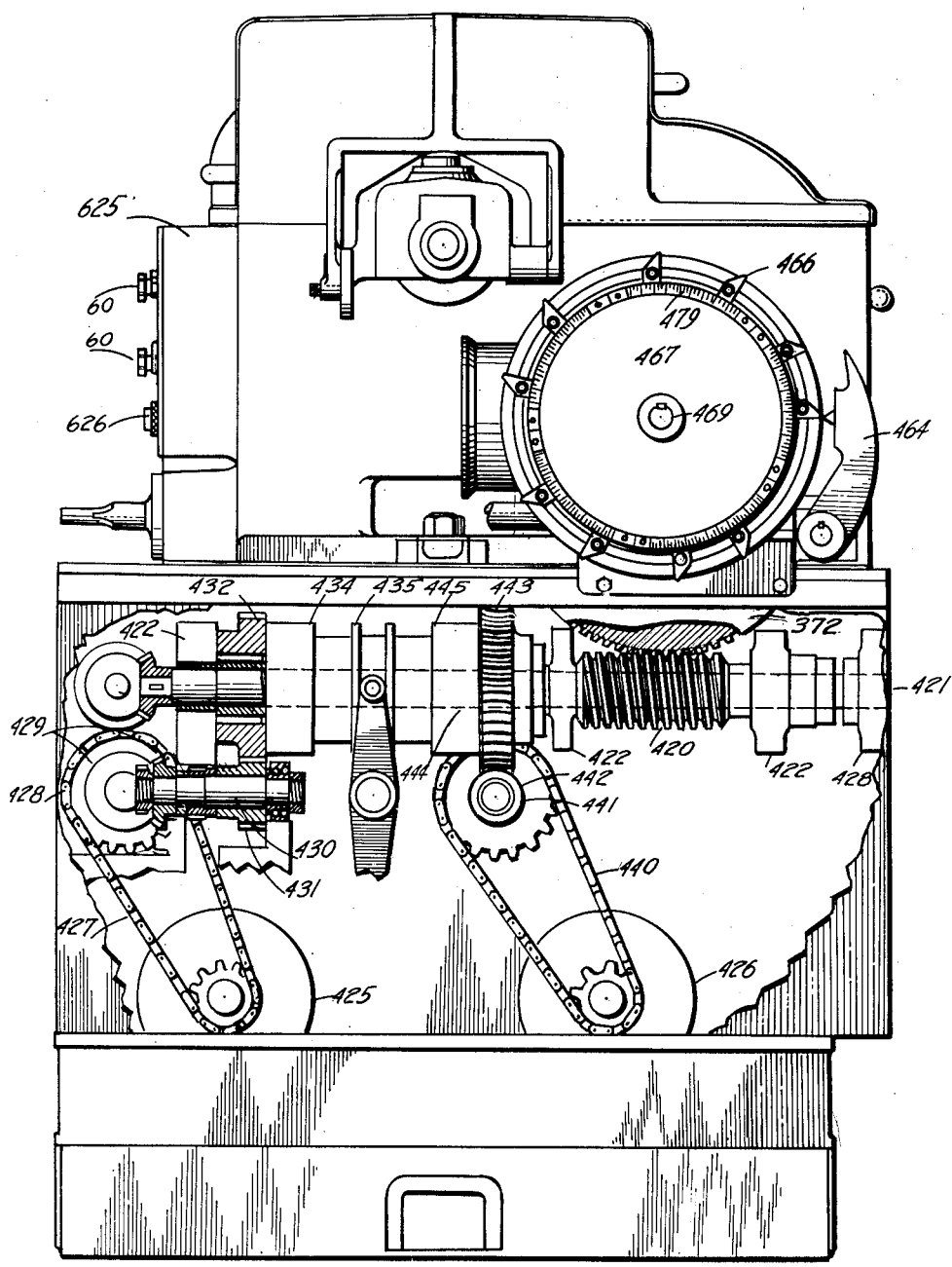
Fig. 28 is an elevation of the machine as viewed from the right of the machine, portions thereof being broken away and shown in section to illustrate the turret feed cam drive mechanism.

The mechanism for this purpose is illustrated principally in Figs. 18 and 23 to 33 inclusive. The turret operating drum 350 is mounted on a shaft 351 driven by worm wheel 372, which in turn is driven by a worm 420 (Figs. 28 and 29) fixed on shaft 421 disposed transversely of the machine below the turret head. The shaft 421, which is journaled in bearings 422, is driven selectively by a constant speed motor 425 or a variable speed motor 426 (Fig. 28). The constant speed motor, which operates the mechanism for rapid traverse, drives the worm shaft through a chain 427, a sprocket 428, bevel gears 429, a shaft 430, a pinion 431 and a spur gear 432 which is freely rotatable on the shaft 421. The spur gear 432 is keyed to a hub portion 433 (Fig. 29) of a multiple disc clutch 434 which is engageable with a shiftable collar 435 for coupling the rapid traverse motor and gearing with the worm 420 and turret operating drum 350.

The variable speed tool feed drive is of a generally similar character. The motor 426 drives a chain 440, a sprocket 441, worm 442 and worm wheel 443. The worm wheel 443 is keyed to the hub 444 of a disc clutch 445, which is engageable with the collar 435. The clutches 434 and 445 and the control mechanisms therefor are of the type heretofore described in connection with the spindle drive save that a manual control mechanism is provided in the assembly to accommodate adjustment of the turret drive into a neutral position. The clutches 434 and 445 are operated through an automatic control mechanism driven by the constant speed motor 425 through the bevel gears 429 and pinion 450 (Fig. 29). The pinion 450 is intermeshed with a gear 451 keyed to a tubular shaft 453 journaled in brackets 454 formed in the machine housing. The pinion 450 drives the gear 451 and a pinion 452 keyed to the shaft 453, drives a gear 455 keyed to a clutch operating shaft 456. The driving member 457 of a rollover clutch is keyed to the shaft 456 and operates the driven member 458 and half-turn cam 459 of the type previously described. The half-turn clutch is engaged at the desired points in the operating cycle of the machine by a spring-pressed latch 460 which is interlinked with a lever 461 actuated by a pull rod 462. The upper end of the pull rod 462 is coupled with an arm 463 oscillated by a cam follower arm 464 having a finger 465 thereon which is engageable with dogs 466 on a feed control disc 467. The feed control disc 467, as shown in Figs. 28 and 32, is provided with an annular T-groove within which the dogs 466 may be clamped. The disc 467 is mounted on a shaft 469 journaled in the side walls of a frame member 471. An internal ring gear 473, bolted to the cam wheel 467, is driven by a pinion 474 on a shaft 475, which is coupled through a flange to the sleeve 373 which is keyed to shaft 351. The ratio between the pinion 474 and ring gear 473 is one to five, so that the disc 467 is rotated one full revolution in each operating cycle of the machine. As shown in Fig. 28, the disc 467 is engraved with suitable markings 479 to facilitate the ready adjustment of the dogs 466. The markings or scales 479 are calibrated relative to the contour of the feed cam 352 to indicate the advance of the turret for corresponding positions of the dogs. When the machine is set up, two of the dogs are set for each turret stroke, the first to effect the shift from rapid transverse to the tool-feed rate when the cutting tool reaches the work piece and the second to effect the shift back to rapid traverse after the cut has been completed.

The shifting operation is effected as follows: The cam 459 (Fig. 29) is engaged by a roller 482 mounted in an arm 483 clamped to a reciprocating rod 484. The rod 484 is guided in a bracket 485 and in an axial bore 486 in the end of a control shaft 487. The shaft 484 is restrained against rotation but is free to reciprocate under the action of the cam 459. The collar 435 which effectuates the actuation of the feed clutches is reciprocated by a lever 490 pivoted intermediate its ends and formed with a clevised end which engages the collar 435. The lower end of the lever 490 is formed with a yoke which is engaged with a grooved collar 492 fixed on the shaft 487. The rod 484 and the shaft 487 are normally coupled for conjoint reciprocative movement, but the parts may be disconnected for manually locking the feed clutches in neutral. The mechanism for such operation comprises an arm 493 fixed on the sliding rod 484, having a roller 494 thereon (Figs. 18 and 29) which is engaged in the narrow upper portion 495 of a slot 496 in a semi-cylindrical follower 497 fixed upon the shaft 487 (see Fig. 18a). The clearance between the roller 494 and the side walls of the narrow portion 495 of the slot is relatively small so that the rod 484 and the shaft 487 will be reciprocated as a unit during normal automatic operation of the clutches. In order to disengage the automatic operating mechanism for the clutch, the shaft 487 is rotated to bring the enlarged lower portion 498 of the slot 496 into alignment with the roller 494. The enlarged portion 498 is of sufficient length to permit full reciprocation of the rod 484 without reciprocation of the shaft 487. Rotation of the shaft 487 to disengage the automatic clutch-operating mechanism is effected by a feed throwout lever 501 (Figs. 1, 18 and 30), fixed on a rotatably-mounted sleeve 502. A yoke 503, fixed to the sleeve 502, engages a pair of collars 504 mounted on the upper end of a rod 505 which is mounted for sliding movement in brackets 506. Collars 507 (Fig. 31) fixed to the rod 505 embrace a clevised rocker arm 508 splined to the shaft 487. Thus, by actuation of the lever 501, the shaft 487 may be rotated counterclockwise (see Fig. 31), releasing the follower 497 from the roller 494 and disengaging the automatic clutch-operating mechanism.

In order to lock the feed clutches out of engagement with the driven members therefor, a latch is provided to retain the shaft 487 in the center of its path of reciprocation. As illustrated in Figs. 18 and 32, an arm 511, fixed to the shaft 487 and interlinked with the arm 501 will be seated in a V-notch 512 of a cam plate 513 fixed to the machine frame when the shaft 487 is rotated to its disengaged position. Therefore, when the automatic clutch control is released, both clutches are locked out of action and when the lever 501 is operated to return the clutches to automatic action, the rod 487 is moved either to the right or the left depending upon the position of the shaft 483, as the narrow portion 495 of the follower cam 497 engages the roller 494. The clutch throwout lever 501 is urged inwardly by a tension spring 520 (Fig. 30) and is latched in a throwout position by a locking lever 521 pivoted on a pin 522. When the lever 501 is pulled forward, a shoulder on the lever 521 engages an abutment on the hub of the lever 501, thus locking it in its actuated position.

*Miscellaneous mechanical features*

The shaft 147 (Fig. 7) through which power is derived for actuating the spindle-drive rollover cam is connected to the driving portion 141 of a universal joint which, as shown in Fig. 32, is mounted on a shaft 530 having a bevel gear 531 thereon intermeshed with a bevel gear 532 on the shaft 456 (see also Fig. 29) keyed to the driving element of the turret drive rollover cam.

The camshaft 115 (Figs. 2 and 10) is driven from the turret operating shaft by a spur gear 540 (Figs. 10 and 21) entrained with a spur gear 541 on the forward end of the turret operating shaft 351. The ratio of the gears is one to five, since the turret operating shaft makes one rotation for each turret position while the main camshaft makes one revolution in each operating cycle.

An oil pump 543 (Figs. 1, 2, and 3) is driven from the spindle clutch rollover cam drive shaft 147 (Fig. 7) through a pair of spur gears 544 and 545.

In order to operate the turret manually while setting up the tools, the machine is provided with a hand crank 551 (Figs. 1 and 30) adapted for engagement with a stub shaft 550 when the power-drive clutches 444 and 445 are disengaged. Rotation of the stub shaft 550 drives a pair of bevel gears 552 and a shaft 553 mounted within the manual control clutch sleeve 502. The shaft 553 is journaled in an outboard bearing bracket 554 and supports a bevel gear 555 intermeshed with a bevel gear 556 on the end of the worm shaft 421. Since this gear train is in constant mesh, the stub shaft 550 will be rotated whenever the motors are in operation and the feed clutches engaged. For the protection of the operator, a mechanism is provided to eject the crank 551 whenever the feed throwout lever 501 is positioned to engage the power turret drive. This mechanism comprises a cam 560 fixed on the sleeve 502 and engaged with a reciprocable pin 561 which bears against a lever 562. The outer end of the lever is disposed in contiguous relation with the face of the crank 551. In operation, when the lever 501 is moved to engage the power feed, the arm 562 will be rocked forwardly, thus forcing the crank out of engagement with the stub shaft 550 and preventing the reapplication thereof.

The entire turret assembly may be adjusted longitudinally of the machine to accommodate work pieces of different finished lengths. The means provided for this purpose are illustrated primarily in Figs. 21, 24, 26 and 35 to 38. The turret casting or assembly 53, in which the indexable tool turret 54 is mounted, is supported on a bed 661 forming a part of the fixed frame of the machine. The turret casting is formed with a plane lower surface 664 which rests upon the plane upper surface 666 of the bed. The frame member 661 is machined with a T-slot 667 for the reception of two hold down bolts 668 and 669 having nuts 670 and 657 thereon to clamp the turret head firmly in place. The bolts 668 and 669 pass through holes 658 and 659 in the base portion 660 of the turret head 54. The base portion 660 of the turret assembly head is formed with tongues 662 and 663 which protrude into a keyway 665 in the wall defining the upper portion of the T-slot 667 to assure precise alignment of the turret head.

The mechanism for adjusting the position of the turret head comprises a shaft 670 (Figs. 1 and 36) having its outer end 671 formed for the reception of a hand crank. The shaft 670 is mounted in a sleeve 672 extending into the turret head from the front side of the machine. A bevel gear 673 keyed to the shaft 670 meshes with the bevel gear 674 forming one end of the sleeve 675 (Fig. 35). The sleeve 675 is journaled in a bearing member 676 fixed to the turret head. The inner faces of the bevel gear 674 and of a flange 677 on the sleeve serve as thrust bearing surfaces against the end faces of the bearing member 676 to prevent axial movement of the sleeve 675 with respect to the turret head. The sleeve is formed with a threaded central bore 678 for the reception of a lead screw 679. The lead screw 679 forms one end of a shaft 680, the other, unthreaded, end of which is slidably received in a bearing member 681 (Figs. 35 and 38) integral with the turret head. The lead screw 679 is restrained against translation or rotation with respect to the bed 661 by a collar 683 secured to the shaft 680 by pins 684. The collar 683 is formed with milled flats on opposite sides thereof which are received within a slot 686 in a bracket 687 secured to the frame member 661. The end portions of the collar 683 are cylindrical and embrace the ends of the upstanding portions 689 of the bracket 687, thereby preventing longitudinal movement of the lead screw 679. It will be noted that this construction facilitates removal of the turret assembly, since the collar 683 may be lifted from the slot 686. To advance the turret head from its extreme rearward position illustrated in Figure 35, the nuts 670 and 657 are loosened and the crank 690 is turned, rotating the sleeve 675 through shaft 670 and bevel gears 673 and 674. Rotation of the sleeve 675 effects the translation thereof upon the lead screw 679, moving the turret head to the left as indicated in Figure 35. The opening 691 in the web 692 of the turret frame which is formed when boring the bracket 681 is closed by a plug 693.

The feed cam drum 350 (Fig. 21) must be advanced with the turret to maintain the proper relation between such parts. The cam drum 350 is slidably mounted on the shaft 351 and locked to the shaft by a key 694 received in keyways 695 and 696 in the hubs of the drum. The left end of the drum in Fig. 21 is formed with a sleeve 697 extending therefrom which passes through a thrust bearing 698 mounted on the movable turret frame. Thrust washers 699 and 701 engaging the faces of the thrust bearing 698 are retained between a flange 702 on the sleeve 697 and a collar 703 affixed upon the sleeve. As the turret assembly is adjusted longitudinally the cam drum 350 is thus moved therewith.

*Cutting compound circulatory system*

The circulatory system for the cutting oil or coolant is designed to afford access to the central axis of the turret for installation of high-speed drilling attachment or similar accessorial parts. This structure is illustrated in Figs. 19 and 20. The turret is provided with an axial tubular shaft 365 which protrudes beyond the right end of the machine and is reciprocated and indexed with the turret. Two concentric tubes 570 and 571 are mounted in the shaft 365 to define an annular passage 572 constituting an oil conduit.

The outer tube 570 is formed to slide readily within the shaft 365 and is clamped at its outer end in an arm 573 bolted to the turret housing bracket 364. The inner end of the passage 572 is sealed to prevent the escape of fluid by a ring 576 brazed or otherwise secured to the two tubes. The coolant is admitted to the passage 571 through an opening 577 in a cap 578 which closes and seals the outer ends of the tubes. The coolant may be fed to the inner end of each of the tool-mounting holes 321 of the turret through an oil pipe 580 mounted in a tapped hole 581 in the hollow shaft 365 and in a plug 582 secured in the inner end of the tool mounting hole. The coolant is delivered from the passage 572 to the pipe 580 as a series of aligned orifices 583 in the outer tube 570 pass the opening in the pipe. The orifices 583 are located to prevent delivery of the fluid when the turret is in the retracted position illustrated in Fig. 19 but will register with the opening 581 in the shaft 365 as shown in Fig. 20 when the turret is advanced.

*Turret drive power control system*

Figure 39:
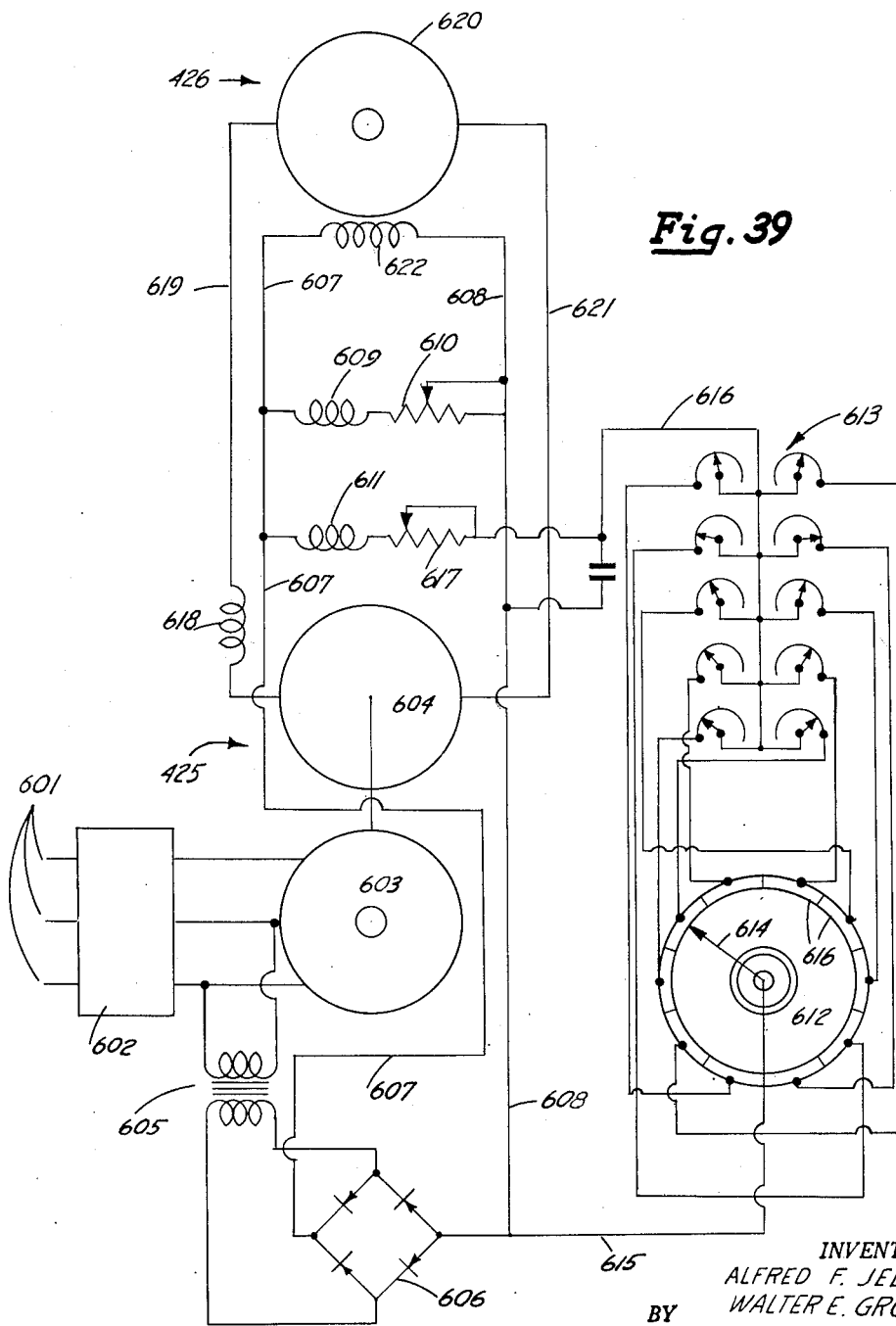
Fig. 39 is a wiring diagram of the feed-control mechanism.

The machine embodies an electrical control system which is designed to facilitate a wide variation of turret rates with a single turret cam without modification of any of the change-speed gearing. The system further facilitates a close regulation of the feed rate and a high degree of efficiency. As pointed out above, the turret drive worm shaft 421 (Fig. 28) may be driven either by the constant speed motor 425 or the variable speed motor 426, depending upon the selection of the clutches 434 and 445. Moreover the engagement of these clutches is controlled by the position of the dogs 466 on the disc 467. The wiring diagram, (Fig. 39) illustrates the manner of control of the power to the motor 426. Power is fed from supply lines 601 through a motor control unit 602 to the armature 603 of the motor 425. As illustrated, the motor 425 is of the three-phase induction type, but may be of any desired type having reasonably constant speed characteristics, either alternating or direct current. The armature 604 of a D. C. generator is coupled to the armature 603 of the motor 425 and is preferably encased in the same frame as the motor armature. The generator is of the type which is formed with differential separately-excited fields and a compensating series field. The excitation of the differential fields is taken from the A. C. power supply through a transformer 605 which supplies a rectifier 606. The direct current output of the rectifier 606 is fed through the lines 607 and 608 to one differential field 609, a variable resistor 610 being provided for adjustment of the field strength.

The second differential field 611 is connected for variable excitation. The difference between the excitation of the field 609 and 611 determines the excitation of the generator and thus its output voltage. The control of the field 611 is achieved by a distributor 612 and a group of rheostats 613. The distributor 612 comprises a contact arm 614 driven from the feed cam shaft of the machine at the rate of one revolution for each machine cycle. The distributor is connected to one side of the direct current supply by a lead 615 coupled with the contact arm 614 which carries the current through contact segments 616 to the rheostats 613 in sequence. The embodiment illustrated herein having a five-position turret, ten rheostats 613 are provided, two for each turret position. At each turret position, one rheostat is connected in the generator feed circuit during the feeding or forward stroke of the turret and a second during the return stroke. The rheostats are all connected by a conductor 616 through an adjusting rheostat 617 to the variable differential field 611 which is connected to the rectifier by the conductor 607. As the machine performs its operating cycle and the rheostats 613 are sequentially connected in the generator field circuit, its output voltage is automatically changed to the values set by the rheostats 613. The generator output passes through a series compensating field 618 and a conductor 619 to the armature 620 of the direct current motor 426, with return current flow through a conductor 621. The field 622 of the direct current motor is connected through lines 607 and 608 to the D. C. field supply. Since the motor has a constant field excitation, its speed is very nearly proportional to the output voltage of the generator armature 604, and may be readily varied over a range of about twenty to one.

The rheostats 613 are installed in a box 625 (Figs. 1 and 28) on the operator's side of the turret head, the rheostats being adjusted by knobs 60 having graduated scales thereon. The distributor 612 is mounted at the right end of the machine. In addition to the rheostat controls, the control box 60 also includes a plurality of push button switches 626 for the running and inching control of the spindle motor and energization of the feed motors. Since switches for this purpose and their manner of connection are well known to those skilled in the motor control art, further description thereof is deemed unnecessary herein. The distributor 612 may be of the form illustrated in Fig. 33 or may be of any suitable type, such, for example, as that described in United States Patent 2,399,165 to Gordon B. Carson. The distributor 612 is driven from the timing shaft 469 (Figs. 32 and 33) through a bevel gear 630 keyed to the shaft and a bevel gear 631 mounted on the distributor shaft 632. The distributor housing 633 is mounted on the frame 471 and is formed for the support of a disk 634 of insulating material having the fixed electrical contacts mounted therein. These contacts embody a ring 635 (Figs. 33 and 34) and ten arcuate distributor segments 616. The contact arm 614, which is fixed to the distributor shaft 632, supports a pair of spring-pressed contacts 636 interconnected by a bar 638 and engaged respectively with the ring contact 635 and the sequential distributor contacts 616.

*The setting of spindle feeds and speeds*

In setting up the machine for a particular sequence of operations, the spindle speed for each operation is computed in contemplation of the nature of the operation and the character of the stock. If only two spindle speeds are required, they may be obtained by selection of appropriate pick-off gears 97, 98, 104 and 105 (Fig. 5). The dogs 168 (Fig. 6) are set on the control wheel 166 to shift from one to the other of the preselected speeds at the desired time in the machine cycle. If a further range of speed is desired, a cam 120 (Fig. 2) may be secured to the drum 121 to actuate the speed control switch 117 to reduce the speed of the motor during some portion of the cycle. In case a threading operation is involved, the cam 119 (Fig. 2) may be employed to reverse the spindle motor 55 in order to back off the tap or die. When the spindle speeds have been selected, the rheostat knobs 60 (Fig. 1) may be adjusted to preset the tool feeds. The feed per revolution will, of course, depend upon the spindle speed as well as the speed of the feed motor 426. After the tool set-up has been completed, the dogs 466 (Fig. 28) on the disc 467 may be set to engage the feed cam drive with the constant speed motor 425 and the variable speed feed motor 426 at the appropriate points in the work cycle so that the tools may be brought in rapid traverse toward and away from the work piece thus accelerating the machine operating cycle.

One of the important advantages of the machine described herein resides in provision of a mechanism in which the feed rate may be adjusted at any time during the operation of the machine. Thus, when it is found by observation of production operations that the feed rate should be altered, such change may be made by merely turning the appropriate control knobs 60. Further advantages of the machine reside in the mechanism to facilitate adjustments of the timed order of operation of the cross slides and the cutoff tool and the manner of setting the stroke of the stock-feeding mechanism. From the foregoing, it will be seen that the machine described herein affords a maximum ease of adjustment, a maximum flexibility of operation and a minimum effort of setup and mechanical complication.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

We claim:

1. In a machine tool, means for advancing and retracting a tool, a motor for driving the means at a rapid traversing rate, a variable-speed motor for driving the means at a cutting rate, clutch means shiftable to connect the first-named means to either motor, means powered by the traversing motor for shifting the clutch means, means operated by the first-named means for causing operation of the shifting means, and means operated by the first-named means for varying the speed of the variable-speed motor.

2. In a machine tool, means for advancing and retracting a tool, a first motor for driving the means at a rapid traversing rate, a generator driven by the first motor, control means operated by the first-named means for varying the output of the generator, a second motor powered by the generator for driving the first-named means at a cutting rate determined by the generator output, and means controlled by the first-named means for connecting either of the motors to drive the first-named means.

3. In a machine tool, means for advancing and retracting a tool, a first motor for driving the means at a rapid traversing rate, a generator driven by the first motor, control means operated by the first-named means for varying the output of the generator, a second motor powered by the generator for driving the first-named means at a cutting rate determined by the generator output, and means actuated by the first-named means for connecting either of the motors to drive the first-named means; the control means comprising a plurality of settable devices and means operated by the first-named means for successively connecting the settable devices into controlling relation to the generator.

ALFRED F. JELINEK.
WALTER E. GROSS.

REFERENCES CITED

The following references are of record in the file of this patent:

UNITED STATES PATENTS

| Number | Name | Date |
|---|---|---|
| 919,986 | Whitney | Apr. 27, 1909 |
| 923,449 | Sellew | June 1, 1909 |
| 1,254,232 | Jann | Jan. 22, 1918 |
| 1,269,489 | Murphy | June 11, 1918 |
| 1,484,604 | Chapman | Feb. 19, 1924 |
| 2,086,851 | Bullard | July 13, 1937 |
| 2,237,183 | Jelinek et al. | Apr. 1, 1941 |
| 2,300,389 | Ruppel | Oct. 27, 1942 |
| 2,310,259 | Ruppel | Feb. 9, 1943 |
| 2,357,427 | Ruppel | Sept. 5, 1944 |
| 2,357,428 | Ruppel | Sept. 5, 1944 |
| 2,388,594 | Bogart | Nov. 6, 1945 |